United States Patent
Yamazaki

(10) Patent No.: US 11,310,387 B2
(45) Date of Patent: Apr. 19, 2022

(54) COLOR IMAGE FORMING APPARATUS AND COLOR MATERIAL CARTRIDGE

(71) Applicant: CANON KABUSHIKI KAISHA, Tokyo (JP)

(72) Inventor: Hiroyuki Yamazaki, Mishima (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/281,467

(22) Filed: Feb. 21, 2019

(65) Prior Publication Data
US 2019/0268484 A1     Aug. 29, 2019

(30) Foreign Application Priority Data
Feb. 28, 2018 (JP) .............................. JP2018-035421

(51) Int. Cl.
| | | |
|---|---|---|
| *G06F 3/12* | (2006.01) | |
| *H04N 1/00* | (2006.01) | |
| *H04N 1/60* | (2006.01) | |

(52) U.S. Cl.
CPC ....... *H04N 1/0097* (2013.01); *H04N 1/00965* (2013.01); *H04N 1/60* (2013.01)

(58) Field of Classification Search
CPC .... H04N 1/0097; H04N 1/00965; H04N 1/60; H04N 1/6058
See application file for complete search history.

(56) References Cited

U.S. PATENT DOCUMENTS

| | | | |
|---|---|---|---|
| 9,800,765 B2 | 10/2017 | Gondek et al. | |
| 2005/0024454 A1* | 2/2005 | Hayamizu | B41J 2/17566 347/86 |
| 2006/0072135 A1* | 4/2006 | Umezawa | H04N 1/6011 358/1.9 |

(Continued)

FOREIGN PATENT DOCUMENTS

| | | | |
|---|---|---|---|
| JP | H11305498 A | | 11/1999 |
| JP | 2004220054 A | * | 8/2004 |

(Continued)

OTHER PUBLICATIONS

English translation of Office Action issued in Japanese Appln. No. 2018-035421 dated Dec. 3, 2021, previously cited in an IDS on Dec. 15, 2021.

*Primary Examiner* — Huo Long Chen

(74) *Attorney, Agent, or Firm* — Rossi, Kimms & McDowell LLP

(57) ABSTRACT

An image forming apparatus is provided, for which a color material cartridge that contains color material and has a storage unit can be attached/detached. The apparatus comprises an obtaining unit that obtains color material information related to a color of the color material stored in the storage unit, a generator that generates a color conversion parameter based on the color material information, and a color convertor that converts the input image signal into a color signal for the color material using the color conversion parameter. If the color material information is not changed, the generator does not generate the color conversion parameter, otherwise the apparatus generates the color conversion parameter based on the color material information after the change.

5 Claims, 19 Drawing Sheets

(56) References Cited

U.S. PATENT DOCUMENTS

| | | | |
|---|---|---|---|
| 2009/0237757 A1* | 9/2009 | Sawada | H04N 1/6097 358/518 |
| 2017/0151801 A1* | 6/2017 | Gondek | B41J 2/17546 |
| 2018/0059998 A1* | 3/2018 | Niina | G06F 3/1215 |
| 2018/0088876 A1* | 3/2018 | Takata | B41J 29/38 |
| 2018/0097943 A1* | 4/2018 | Morovic | H04N 1/00063 |

FOREIGN PATENT DOCUMENTS

| | | | |
|---|---|---|---|
| JP | 2006103216 A | | 4/2006 |
| JP | 2014166685 A | * | 9/2014 |
| JP | 2015046696 A | | 3/2015 |
| JP | 2017527860 A | | 9/2017 |
| WO | 2016186625 A1 | | 11/2016 |

* cited by examiner

F I G. 11A
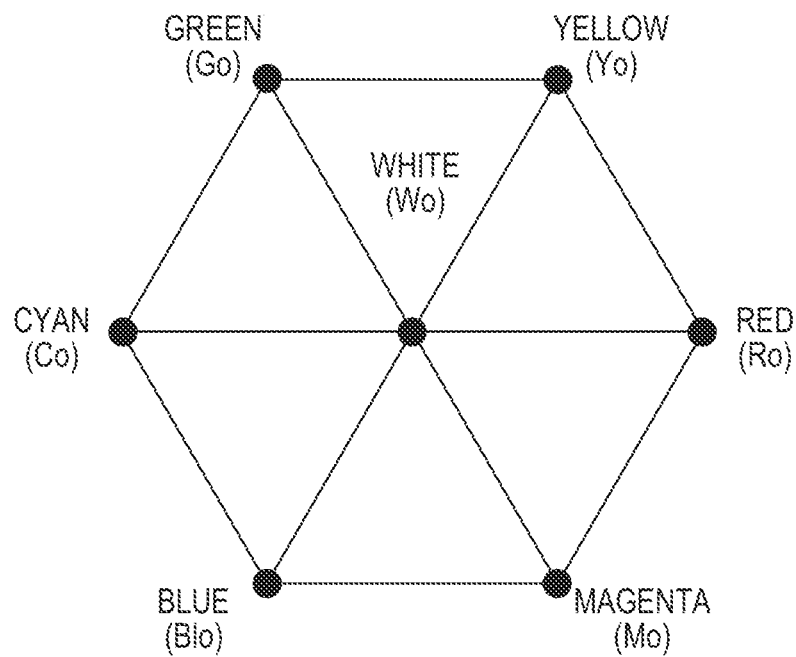
F I G. 11B
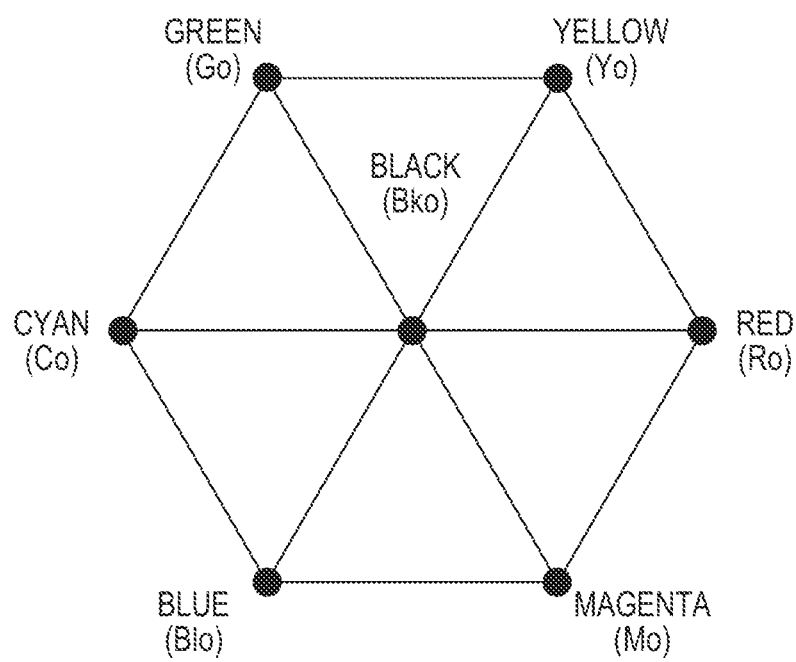

F I G. 12

| COLOR | (R, G, B) | (C, M, Y, K) |
|---|---|---|
| Wo | (100, 100, 100) | (0, 0, 0, 0) |
| Co | (0, 100, 100) | (100, 0, 0, 0) |
| Mo | (100, 0, 100) | (0, 100, 0, 0) |
| Yo | (100, 100, 0) | (0, 0, 100, 0) |
| Ro | (100, 0, 0) | (0, 100, 100, 0) |
| Go | (0, 100, 0) | (100, 0, 100, 0) |
| Blo | (0, 0, 100) | (100, 100, 0, 0) |
| Bko | (0, 0, 0) | (50, 40, 10, 100) |

FIG. 17

| COLOR | (R, G, B) | (C, M, Y, R) |
|---|---|---|
| Wo | (100, 100, 100) | (0, 0, 0, 0) |
| Co | (0, 100, 100) | (100, 0, 0, 0) |
| Mo | (100, 0, 100) | (0, 100, 0, 0) |
| Yo | (100, 100, 0) | (0, 0, 100, 0) |
| Ro | (100, 0, 0) | (0, 50, 50, 100) |
| Go | (0, 100, 0) | (100, 0, 100, 0) |
| Blo | (0, 0, 100) | (100, 100, 0, 0) |
| Bko | (0, 0, 0) | (100, 60, 40, 0) |

COLOR IMAGE FORMING APPARATUS AND COLOR MATERIAL CARTRIDGE

BACKGROUND OF THE INVENTION

Field of the Invention

The present invention relates to an image forming apparatus such as a printer, copying machine, recording device, fax machine, or the like that forms an image based on an image signal, and to a color material cartridge.

Description of the Related Art

In recent years, printing by a color image forming apparatus employing a method such as an electrophotographic method or an inkjet method has become widespread. In the color image forming apparatuses, using a color material such as toner or ink of a plurality of colors is common. In the color image forming apparatuses, an image signal normally configured by RGB color signals or the like is inputted, the image signal is converted into color signals of the color material colors (CMYK, for example) of an image forming apparatus, and then a color image is formed on a print medium by overlaying color materials of amounts based on the respective color signals. At this time, a color conversion parameter for converting inputted color signals into color material colors are decided to be appropriate values based on color development of each color material of the color image forming apparatus.

The color conversion parameter is generally specified on the premise that invariably the tint of the color material will not change. However, there are cases where the tint of the color material changes due to an improvement in a capability such as an improvement in color reproducibility and cases where a change in the tint of the color material arises depending on when the cartridge in which the color material is stored was manufactured, or the like. In such a case, the tint will change upon a cartridge exchange, and the color formed on the print medium will change to a color not desired by the user even if color signals after color conversion have the same values.

In relation to the above-described problem, a printer cartridge equipped with a compressed multi-dimensional color table is disclosed in Japanese Patent Laid-Open No. 2017-527860. Also, Japanese Patent Laid-Open No. 11-305498 discloses a development cartridge in which, in addition to the date of manufacture and serial number, color conversion coefficients is stored, and discloses an image forming apparatus that reads color conversion coefficients corresponding to a combination of the serial numbers of the respective cartridges from the latest cartridge mounted on the image forming apparatus.

However, the multi-dimensional color table in the method of Japanese Patent Laid-Open No. 2017-527860 must be a huge table in order to guarantee accuracy. For this reason, there is a problem that the space for storing the table, even if compressed, becomes enormous and that the cost of a storage medium increases. Furthermore, there is a problem in that when a color table is stored in a specific printer cartridge, the color changes if the tint of the toner of another cartridge which does not have a color table changes.

Also, in the method of Japanese Patent Laid-Open No. 11-305498, when the number of cartridges of a series increases, the number of cartridge combinations increases accordingly, and the space for color conversion coefficients also increases. As a result, there is a problem in that the space for storing color conversion coefficients becomes enormous and that the cost of a storage medium increases. Additionally, there is a problem that management of cartridges becomes complex when the number of cartridge combinations increases and the cost of management also increases.

SUMMARY OF THE INVENTION

The present invention has the following configuration.

According to the first aspect of the present invention, there is provided an image forming apparatus for which a color material cartridge that contains color material and has a storage unit can be attached/detached, the image forming apparatus operable to form, based on an input image signal, a visible image according to color material on a print medium, the apparatus comprising: an obtaining unit configured to obtain color material information related to a color of the color material stored in the storage unit; a generation unit configured to generate a color conversion parameter based on the color material information obtained by the obtaining unit; and a color conversion unit configured to convert the input image signal into a color signal for the color material by using the color conversion parameter, wherein the generation unit, in a case where the color material information is not changed, does not generate the color conversion parameter, and in a case where the color material information changed, generates the color conversion parameter based on the color material information after the change.

According to the second aspect of the present invention, there is provided a color material cartridge that can be attached/detached with respect to an image forming apparatus operable to perform image formation based on a color signal resulting from conversion from an input image signal, the cartridge comprising: a storage unit configured to store color material; and a storage unit configured to store color material information related to a color of the color material, wherein the color material information is information for generating, based on the color material information, a color conversion parameter for converting an input image signal that is inputted into the image forming apparatus into a color signal of the color material, and the color material information is used for generation of the color conversion parameter by the image forming apparatus in a case where the color material information changed for a color material cartridge that was mounted to the image forming apparatus.

Further features of the present invention will become apparent from the following description of exemplary embodiments with reference to the attached drawings.

BRIEF DESCRIPTION OF THE DRAWINGS

FIG. 11A is a view illustrating fundamental colors at a time of a color separation table generation.

FIG. 11B is a view illustrating fundamental colors at a time of a color separation table generation.

FIG. 12 is a view illustrating an example of RGB and CMYK values of fundamental colors.

FIG. 17 is a view illustrating an example of RGB and CMYR values of fundamental colors of a third embodiment.

DESCRIPTION OF THE EMBODIMENTS

Explanation is given in detail below, with reference to the drawings, of examples of preferred embodiments of the invention. However, the configuration elements described in this embodiment are only examples, and the scope of the invention is not limited to these.

First Embodiment

[Overall Configuration of Image Forming Apparatus]

In the present embodiment, description is given using a color image forming apparatus of an electrophotographic method for forming an image by four colors of toner (color material), cyan, magenta, yellow, and black (referred to as C, M, Y, and K hereinafter).

Figure 1:
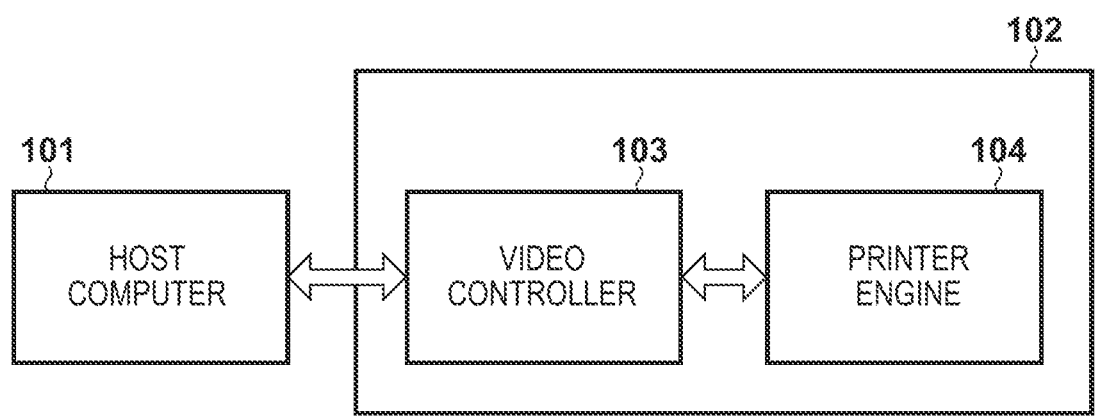
FIG. 1 is an overall configuration diagram of an image forming apparatus.

Description is given of the overall configuration of the image forming apparatus in the present embodiment using FIG. 1. An image forming apparatus 102 in the present embodiment is configured by a video controller 103 for performing various control and data processing, and a printer engine 104 for performing formation of a visualized image onto a print medium. A host computer 101 that makes an instruction for the execution of printing to the image forming apparatus 102 via a network, a parallel interface, a serial interface, or the like is connected to the image forming apparatus 102. Also, the video controller 103 rasterizes, into image data, print data that is transmitted when execution of a print is instructed from the host computer 101, performs later-described data processing, and transmits a result to the printer engine 104. The printer engine 104 performs image formation onto a print medium based on the transmitted image data.

[Printer Engine Control]

Figure 2:
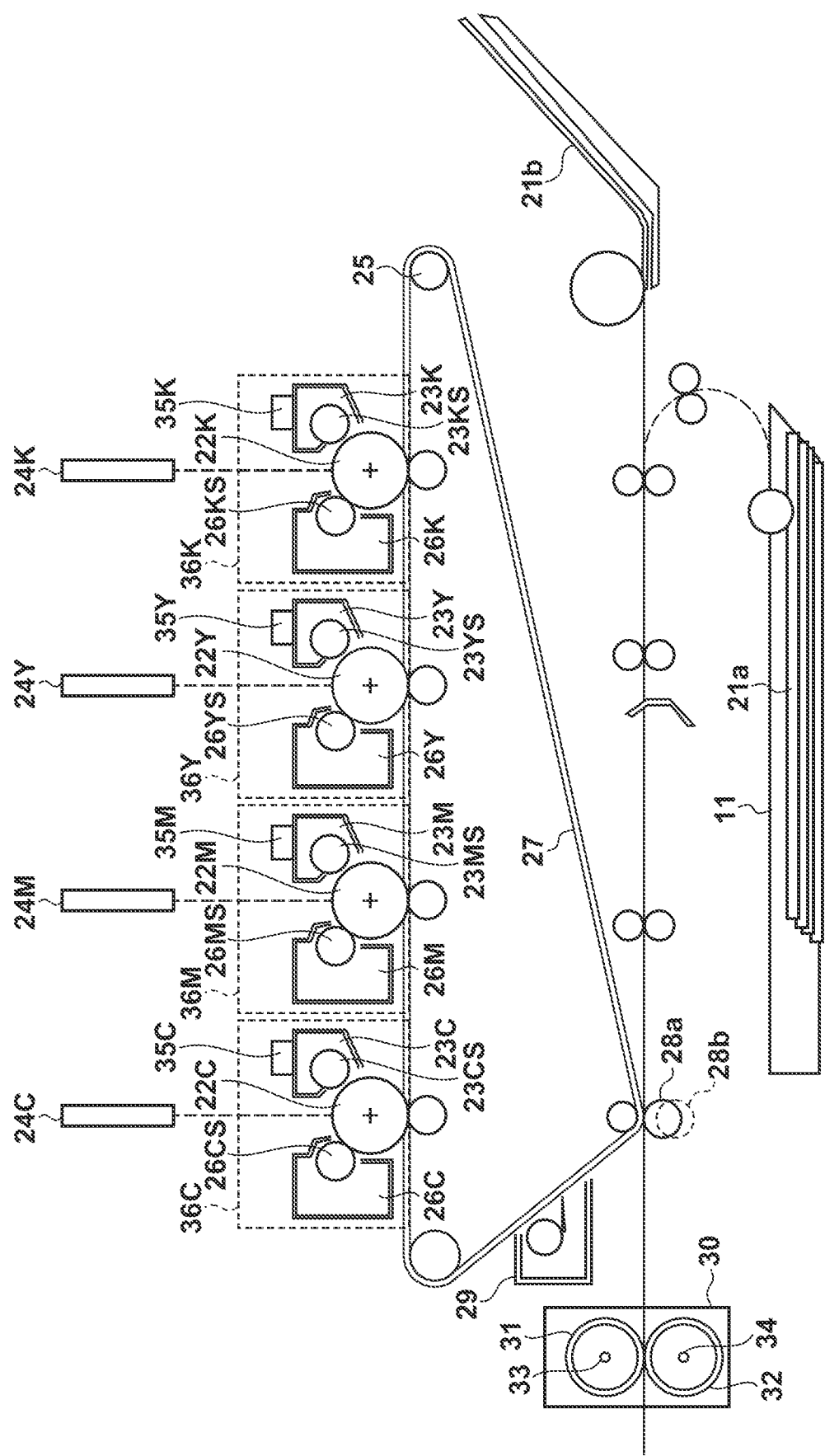
FIG. 2 is a cross-section view of the image forming apparatus.
Figure 3:
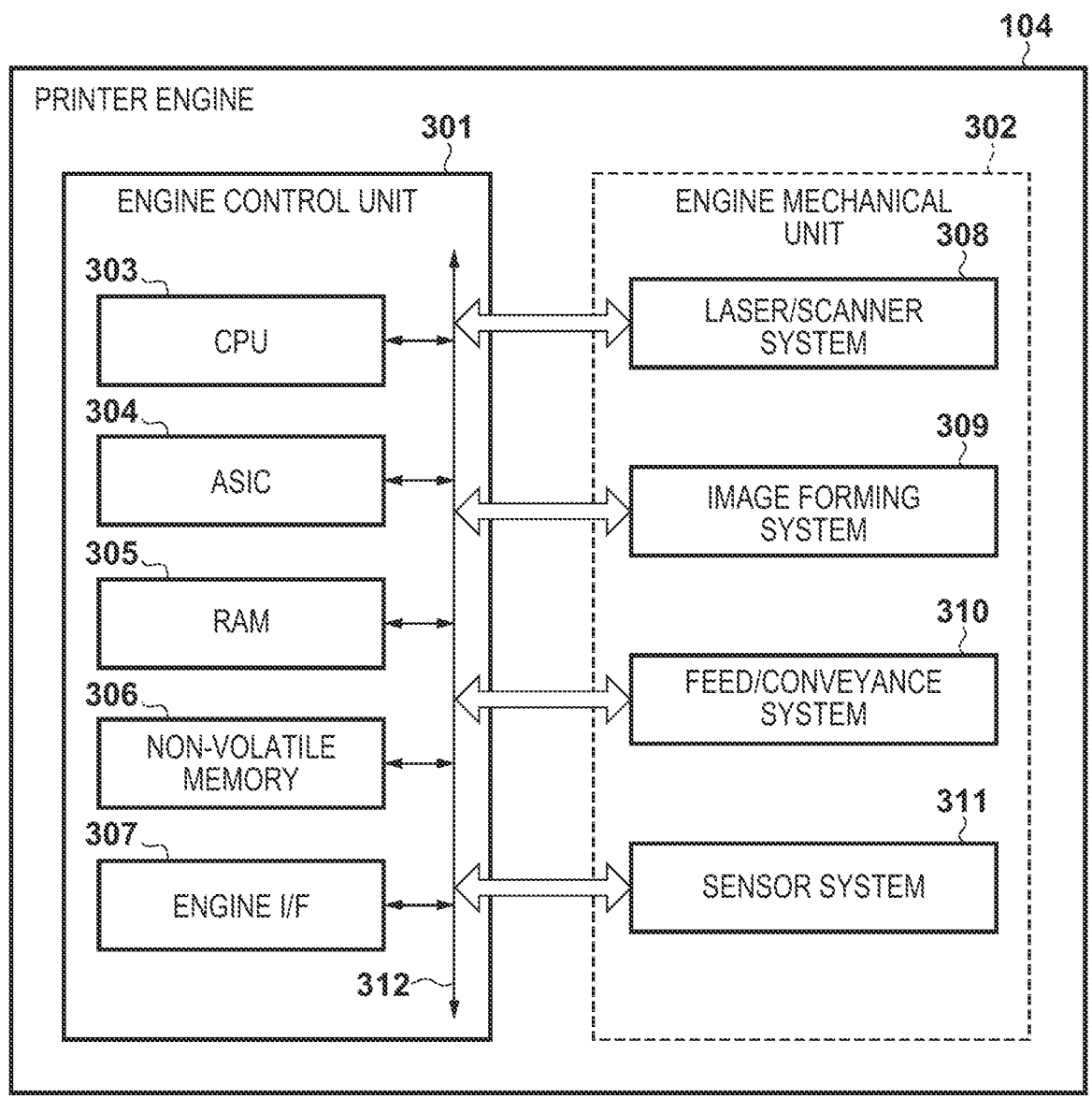
FIG. 3 is a block diagram of a printer engine.

Description is given of operation of the printer engine 104 in an electrophotographic method color image forming apparatus 102 using FIG. 2 and FIG. 3. FIG. 2 is a view illustrating a cross section of a tandem method color image forming apparatus that employs an intermediate transfer body 27 and that is one example of an image forming apparatus of an electrophotographic method. FIG. 3 is a control block view of the printer engine 104. The printer engine 104 is broadly configured by an engine control unit 301 and an engine mechanical unit 302. The engine mechanical unit 302 moves according to various instructions from the engine control unit 301. Firstly, details of the engine mechanical unit 302 will be described using FIG. 2, and then the engine control unit 301 will be described in detail.

Engine Mechanical Unit

A laser/scanner system 308 includes a laser emitting element, a laser driver circuit, a scanner motor, a rotating polygonal mirror, a scanner driver, and the like. The scanner units 24C, 24M, 24Y, and 24K of FIG. 2 correspond to this. Note that C, M, Y, and K in these symbols indicate configuration elements for respective color components. In the description below, 24C, 24M, 24Y, and 24K are abbreviated as 24C, M, Y, and K. The same is done for other reference numerals. The scanner units 24C, M, Y, and K turn on lasers in accordance with laser driving signals indicating an exposure time of a laser sent from the video controller 103, and expose/scan the photosensitive drums 22C, M, Y, and K by causing laser beams to reflect off of rotating polygonal mirrors. Configuration is such that an electrostatic latent image is formed by selectively exposing the surfaces of the photosensitive drums 22C, M, Y, and K to exposure light.

An image forming system 309 is the central component of the printer engine 104, and is a part that causes a toner image that is based on an electrostatic latent image formed on the photosensitive drums 22C, M, Y, and K to be formed on a print medium.

The image forming system 309 is configured by photoconductive elements (22C, M, Y, and K), injection charging units (23C, M, Y, and K) and developers (26C, M, Y, and K) for stations arranged adjacently for the respective developing colors, processing elements such as an intermediate transfer body 27, a transfer roller 28, and a fixing portion 30, and a high-voltage power supply circuit that generates various biases (high voltages) for performing image formation.

A primary charge member in the present embodiment is a configuration comprising four injection chargers 23C, M, Y, and K for charging the photosensitive drums 22C, M, Y, and K of each station, and sleeves 23CS, MS, YS, and KS comprised in each injection charger.

The photosensitive drums 22C, M, Y, and K are configured by coating an organic photoconductive layer on the outer circumference of an aluminum cylinder; the photosensitive drums 22C, M, Y, and K rotate by a driving force of drive motors (not shown) being transferred and the drive motors cause the photosensitive drums 22C, M, Y, and K to rotate in a counterclockwise direction in accordance with an image forming operation.

A development unit is a configuration comprising four the developers 26C, M, Y, and K that develop C, M, Y, and K in respective stations in order to visualize the above-described an electrostatic latent image, and sleeves 26CS, MS, YS, and KS are provided in the respective developers 26C, M, Y, and K. The chargers 23, developers 26, and photosensitive drums 22 are respectively integrated as color material cartridges 36C, M, Y, and K that store color material, and are attached detachably to the image forming apparatus main body. Note that the color material cartridges are detachable from the image forming apparatus, and are also referred to simply as cartridges.

The intermediate transfer body 27 is in contact with the photosensitive drums 22C, M, Y, and K, and rotates in a clockwise direction during color image forming by an intermediate transfer member driving roller 25, rotates in accordance with the rotation of the photosensitive drums 22C, M, Y, and K, and thereby monochromatic toner images are transferred thereto. After that, a later-described transfer roller 28 that is in contact with the intermediate transfer body 27 conveys/sandwiches a transfer medium 11, and a multicolor toner image on the intermediate transfer body 27 is transferred to the transfer medium 11.

The transfer roller 28, while the multicolor toner image is being transferred onto the transfer medium (in other words, the print medium) 11, abuts the transfer medium 11 at the position of 28a, and after a text printing process, separates to the position of 28b. Accordingly, the color materials of the respective color components are overlapped on the transfer medium 11, and thereby a visible color image is formed on the transfer medium 11.

The fixing portion 30 fuses/fixes the transferred multicolor toner image to the transfer medium 11 while conveying the transfer medium 11, and comprises a fixing roller 31 for heating the transfer medium 11 and a pressure roller 32 for causing the transfer medium 11 to be pressed against the fixing roller 31. The fixing roller 31 and the pressure roller 32 are formed to be hollow, and heaters 33 and 34 are incorporated therein. In other words, while the transfer medium 11 holding the multicolor toner image is conveyed by the fixing roller 31 and the pressure roller 32, heat and pressure are applied, and toner is affixed to its surface.

A cleaning unit 29 cleans toner that remains on the intermediate transfer body 27, and residual toner that remains after transfer of the four-color multicolor toner image formed on the intermediate transfer body 27 to the transfer medium 11 is stored in a cleaner container.

Also, non-volatile cartridge memories 35C, M, Y, and K are configured in the cartridge 36, and later-described CPU 303 or ASIC 304 performs reading and writing of various information with respect to these cartridge memories 35. This concludes the description of the image forming system 309.

Returning to FIG. 3, a feed/conveyance system 310 is a component that controls feeding and conveyance of print media, and is configured by various conveyance system motors, a sheet feed unit 21, a discharge tray (not shown), and various conveyance rollers including a paper feed roller, and a discharge roller. The feed/conveyance system 310 is a part that feeds/conveys a transfer medium 11 from a feed cassette 21a or a sheet feeding tray 21b in accordance with the operation of the image forming system 309, and discharges the transfer medium 11 to a discharge tray.

A sensor system 311 is a sensor group for collecting information needed for the later-described CPU 303 and ASIC 304 to control the laser/scanner system 308, the image forming system 309, and the feed/conveyance system 310. In this sensor group, various sensors that are already known are included such as a temperature sensor of a fixing device, a density sensor for detecting the density of an image, a color misregistration detection sensor for detecting a color misregistration, a paper size sensor, a paper leading edge detection sensor, a sheet conveyance detection sensor, and the like. Information detected by each of these sensors is obtained by the CPU 303, and is reflected in print sequence control. Note that a laser/scanner system, an image forming system, and a feed/conveyance system are described separately from the sensor system in the drawing, but configuration may be taken so as to include them in any mechanism.

Engine Control Unit

Next, the engine control unit 301 will be described. The CPU 303 uses a RAM 305 as a main memory and a work area, and controls the engine mechanical unit 302 described above in accordance with various control programs stored in a non-volatile memory 306. A system bus 312 is a system bus that has an address bus and a data bus. The foregoing configuration elements are connected to the system bus 312, and can access each other thereby.

When the CPU 303 receives from the video controller 103, via an engine interface unit 307, an instruction to execute printing, the CPU 303 first drives the image forming system 309, and charges the photosensitive drums 22C, M, Y, and K by the injection chargers 23C, M, Y, and K.

Next, the CPU 303, based on a laser driving signal that is modulated based on the input image signal, drives the laser/scanner system 308, and forms electrostatic latent images on the surface of the photosensitive drums 22C, M, Y, and K.

The CPU 303 next drives the image forming system 309 to develop the electrostatic latent images, and form a monochromatic toner image for each color component, and then form a four-color CMYK toner image on the intermediate transfer body 27 by overlapping these monochromatic toner images. The transfer medium 11 is fed from the sheet feed unit 21 by the paper feed roller by simultaneously controlling the feed/conveyance system 310, this multicolor toner image is transferred to the transfer medium 11. Thereafter, the multicolor toner image is fixed on the transfer medium 11 by the fixing portion 30, and the transfer medium 11 to which the toner image is affixed is discharged to a discharge tray by the discharge roller. After that, the toner remaining on the intermediate transfer body 27 is cleaned by the cleaning unit 29 and the image forming operation is ended.

Also, the CPU 303 obtains information necessary to control the image forming system 309 and the feed/conveyance system 310 by driving the sensor system 311.

Meanwhile, the ASIC 304, based on an instruction by the CPU 303, performs control of each motor on top of having executed the various print sequences described above and control for a high-voltage power supply of a developing bias or the like. Note that some or all of the functions of the CPU 303 may be performed by an ASIC 304, and conversely, some or all of the functions of the ASIC 304 may be performed instead by the CPU 303. Also, separate dedicated hardware may be provided, and some or all of the functions of the CPU 303 and the ASIC 304 may be performed by the dedicated hardware.

[Video Controller Configuration]

Figure 4:
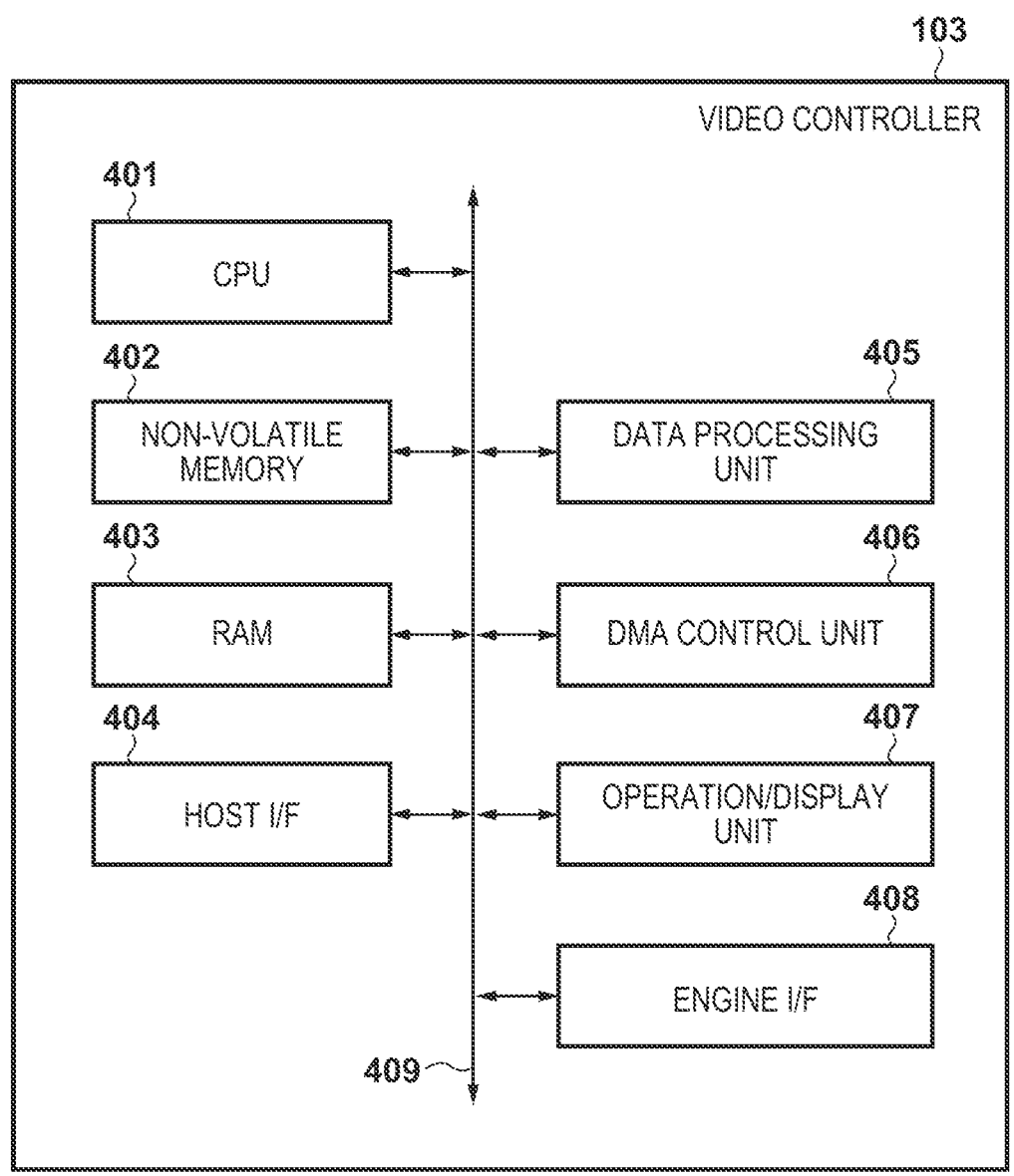
FIG. 4 is a block diagram of a video controller.

The video controller 103 is configured as in FIG. 4. Reference numeral 401 is a CPU that manages control of the video controller 103 as a whole. Reference numeral 402 is a non-volatile memory that stores various control code that the CPU 401 executes and data used for control. This corresponds to an EEPROM, a hard disk, or the like. Reference numeral 403 is a temporary storage RAM that functions as a main memory, a work area, and the like for the CPU 401.

Reference numeral 404 is a host interface unit that is an input/output unit for inputting/outputting print data and control data with respect to the host computer 101. Print data received by the host interface unit 404 is stored in the RAM 403. This print data is typically data described in a printer definition language for generating page image data referred to as PDL, and normally, rendering commands for rendering data such as text, graphics, images, and the like are included therein.

Reference numeral 406 is a DMA control unit, which, in accordance with an instruction from the CPU 401, transfers data of the RAM 403 to an engine interface unit 408 and a data processing unit 405. Reference numeral 405 is a data processing unit that performs various processes in relation to image data in the RAM 403 in accordance with instructions from the CPU 401. Detailed operation of the data processing unit 405 will be described later. Reference numeral 407 is an operation/display unit provided in the image forming apparatus main body, which inputs various settings and instructions from a user, and displays various information of the image forming apparatus on a panel.

Reference numeral 408 is an engine interface unit which is an input/output unit for inputting and outputting signals with respect to the printer engine 104, and which performs control for communication with the printer engine 104 in addition to sending to the printer engine 104 laser driving signals outputted from the data processing unit.

Reference numeral 409 is a system bus that has an address bus and a data bus. The foregoing configuration elements are connected to a system bus 409, and can access each other thereby.

Note that the functions of the data processing unit 405 may be realized by an ASIC or dedicated hardware, and some or all of the functions may be performed by the CPU 401. Furthermore, some of all of the functions of the video controller 103 may be performed by an external device such as the host computer 101.

[Data Processing Unit Configuration]

Figure 5:
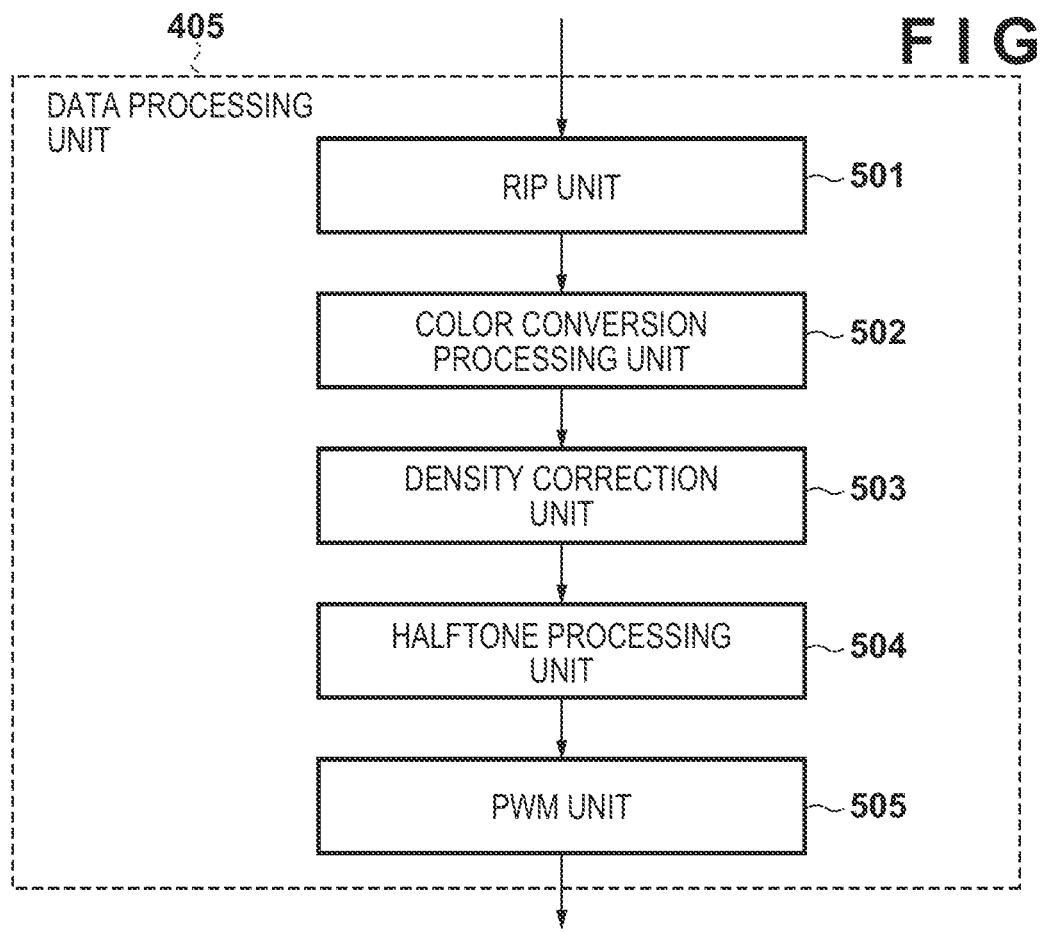
FIG. 5 is a block diagram of a data processing unit.

FIG. 5 is a block diagram for describing details of processing of the data processing unit 405. An RIP unit 501 generates an intermediate language by analyzing details of page description language of print data stored in the RAM 403 and performing rasterization thereof into raster image data. The raster image data after having been rasterized is written in a predetermined region in the RAM 403 as RGB image data.

Figure 6:
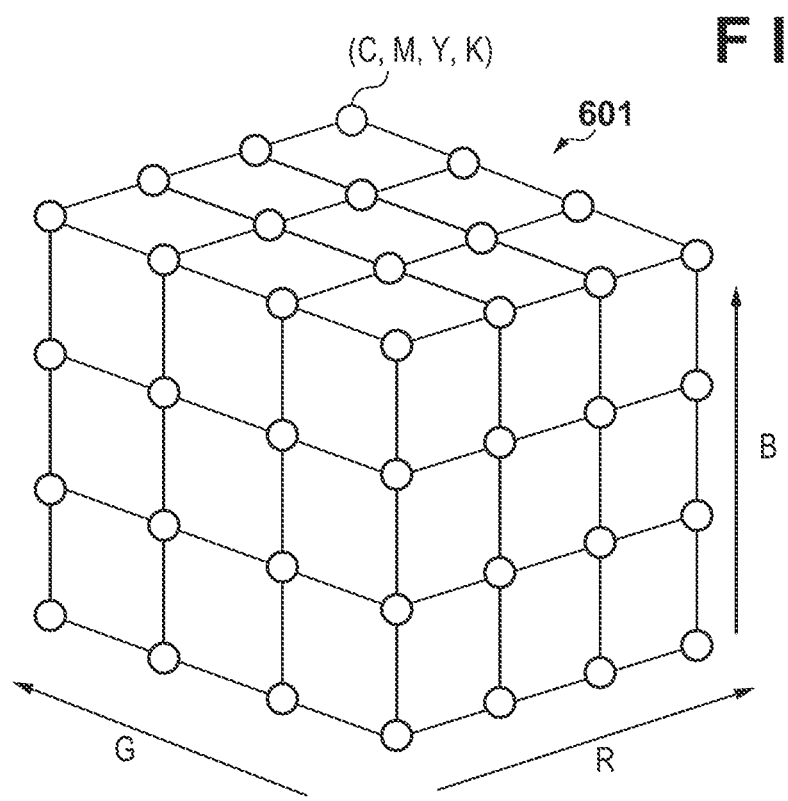
FIG. 6 is a view illustrating a color conversion parameter.
Figure 7A:
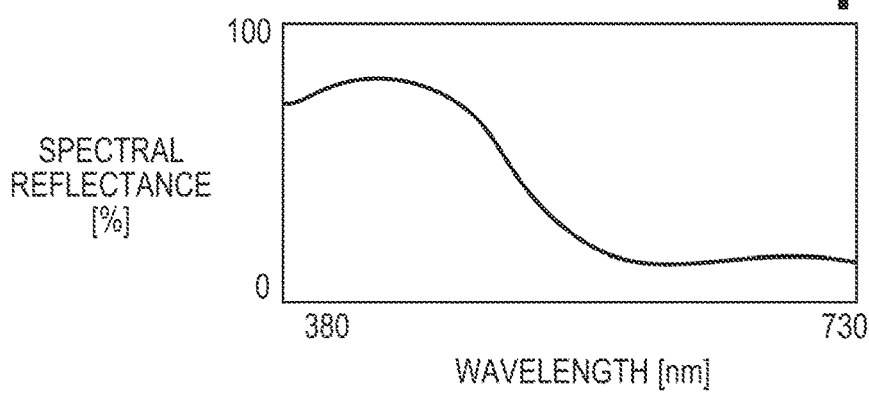
FIG. 7A is a view illustrating a distribution of spectral reflectance.
Figure 7B:
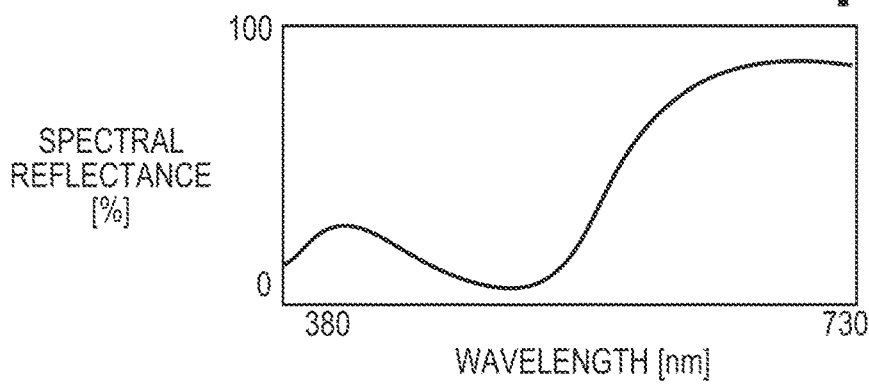
FIG. 7B is a view illustrating a distribution of spectral reflectance.
Figure 7C:
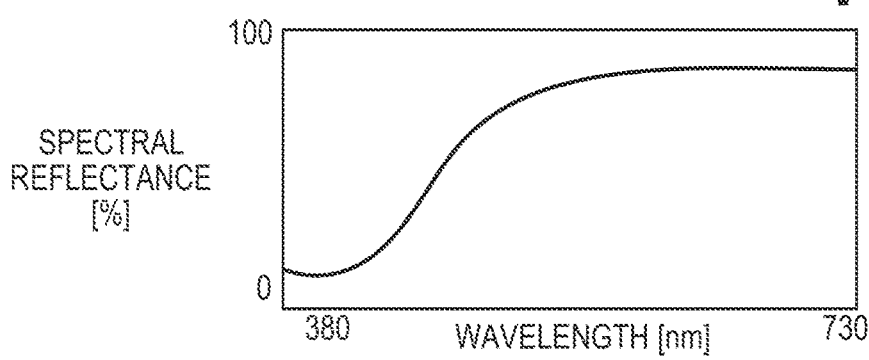
FIG. 7C is a view illustrating a distribution of spectral reflectance.
Figure 7D:
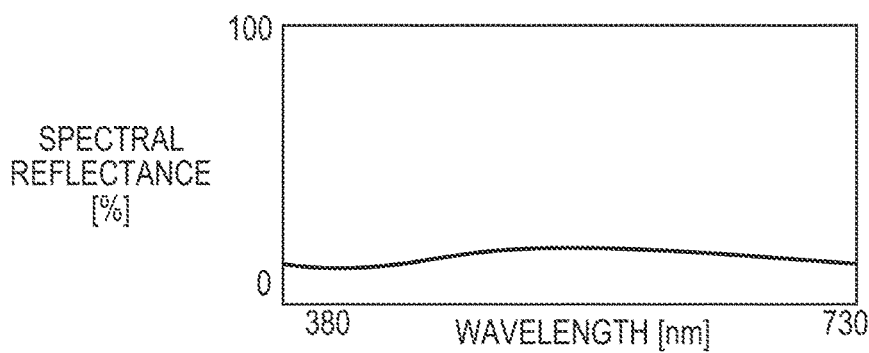
FIG. 7D is a view illustrating a distribution of spectral reflectance.

A color conversion processing unit 502 performs processing for converting an RGB image signal into a CMYK signal for the toner color material colors of the image forming apparatus, sequentially converts RGB image data that was rasterized by the RIP unit into CMYK image data, and writes the result into a predetermined region in the RAM 403. In a non-volatile memory 402, a color conversion table 601 as in FIG. 6 is held. The color conversion table is also referred to as a color conversion parameter. The color conversion table 601 is a table that holds CMYK values that correspond to each three-dimensional grid point that is determined by respective RGB color component values. RGB values inputted into the color conversion processing unit 502 are converted into CMYK values. Upon conversion, CMYK value conversion is performed by performing an interpolation calculation by a method such as cubic interpolation, prism interpolation, pyramid interpolation, tetrahedral interpolation and the like between grid points of the color conversion table 601 in relation to input RGB values.

A density correction unit 503 converts each tone value of the CMYK image data by an LUT (lookup table) so that a relationship between each tone value of the CMYK image data generated by the color conversion processing unit 502 and the density outputted onto the print medium 11 by the printer engine 104 is a desired relationship.

A halftone processing unit 504, by applying a halftone process such as an organized dither in relation to respective image data of CMYK after it is corrected by the density correction unit 503, performs quantization into image data that is representable in the printer engine 104, and outputs the result to the image memory in the RAM 403. The halftone processing is a process for converting inputted image data using a threshold matrix.

By PWM (Pulse Width Modulation) processing for the halftone processed image in the image memory in a PWM unit 505, a conversion into a laser driving signal (laser exposure time) is performed.

[Video Controller Operation]

An overall flow from when a print instruction is received from the host computer 101 until when data is transmitted to the printer engine 104 will be described. When a print instruction is received from the host computer 101 via the host interface unit 404, the CPU 401 receives print data via the host interface unit 404 and stores it in the RAM 403. Next, the data processing unit is controlled and, in relation to image data in the RAM 403, as described above, rasterization processing by the RIP unit 501, color conversion processing by the color conversion processing unit 502, density correction processing by the density correction unit 503, halftone processing by the halftone processing unit 504, and PWM processing by the PWM unit 505 are performed. The laser driving signal resulting from performing the PWM processing is transmitted to the printer engine 104 via the engine interface unit 408 by an instruction of the CPU 401.

[Operation Upon Cartridge Exchange]

Figure 8:
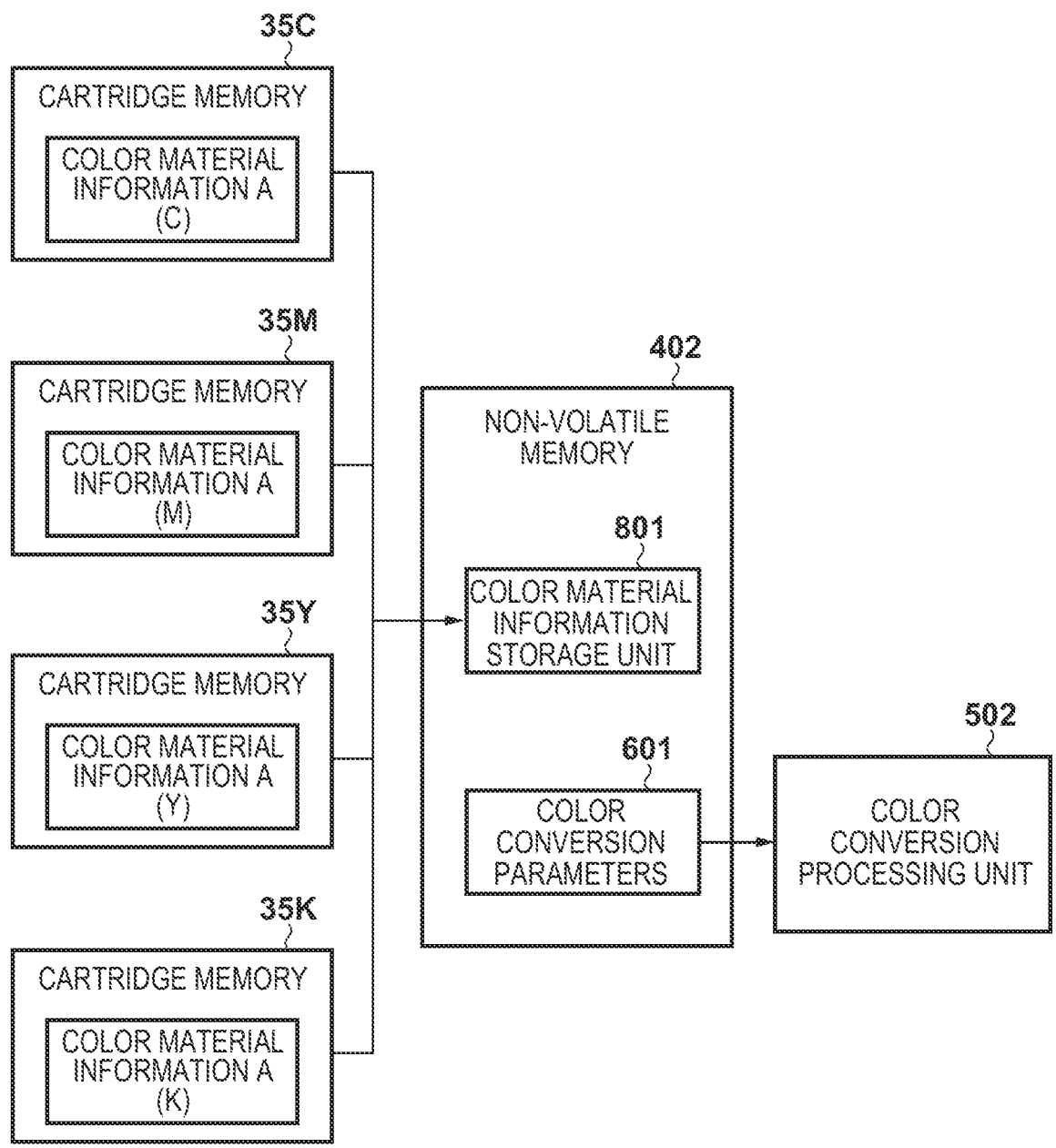
FIG. 8 is a view illustrating a dataflow.

Next, an operation at a time of exchanging cartridges will be described using FIG. 9. In FIG. 8, a dataflow at a time of cartridge exchange is illustrated.

CMYK spectral reflectance data as illustrated in FIG. 7A to FIG. 7D is respectively stored as color material information A (C, M, Y, K) in cartridge memories 35C, M, Y, and K. The color material information A of each color component may be a table that associates discrete wavelengths and the spectral reflectances at the wavelengths.

In addition, in a color material information storage unit 801 in the non-volatile memory 402, CMYK and sheet spectral reflectance data is stored as color material information B. Values based on color material information prior to the exchange of cartridges are stored in the color material information B. The color material information A is referred to as first color material information and the color material information B is referred to as second color material information.

In the case of exchanging one of the cartridges 36 (C, M, Y, or K) or a plurality of the cartridges 36, the CPU 303 of the printer engine 104 reads the color material information A in the cartridge memory 35 of a cartridge 36 that was exchanged, and transmits the color material information A to the video controller 103 via the engine I/F 307. The CPU 401 of the video controller 103 performs the processing below. Note that there are various methods for achieving identification by the CPU 303 of which color cartridge was exchanged. For example, the CPU 303 obtains the cartridge ID stored in each cartridge memory 35, and stores it in the non-volatile memory 306. Then, the CPU 303 obtains the cartridge ID of each cartridge currently stored in the cartridge memory of each cartridge, compares it against pre-stored cartridge IDs, and identifies cartridges that were exchanged from the difference. Alternatively, a region that stores a new product flag is provided in the cartridge memory 35, and the CPU 303 identifies a new cartridge that was newly mounted on the printer by reading the new product flag.

The CPU 401 receives (step S901) the color material information A that was transmitted, and determines (step S902) whether or not the received color material information A and the color material information B for the color corresponding to the color material information storage unit 801 are the same. Here, the color material information A corresponds to color material information of each color that was exchanged, and for example, the cartridge 36C and the cartridge 36Y are assumed to be cartridges that were newly exchanged. In such a case, the color material information A received by the CPU 401 is the color material information A (C) and the color material information A (Y). Note that, as another reception method, the CPU 401 may receive color material information of all color components from the printer engine first, and then extract only color material information A of colors for the cartridges that were exchanged.

If the color material information A and the color material information B for all cartridges that were exchanged are the same, the processing ends when the color of the color material has not changed. If the color material information A and the color material information B for a corresponding color are not the same for even one of the colors, it is determined that the color of the color material changed, and the processing proceeds to step S903. For example, the CPU 401, in a case where the color material information A (C) and the color material information A (Y) were received from the printer engine, determines NO in step S902 if the color material information A (C) is the same as the color material information B (C) but the color material information A (Y) differs from the color material information B (Y).

Meanwhile, the CPU 401 determines YES in step S902 if the color material information A (C) is the same as the color material information B (C) and the color material information A (Y) is the same as the color material information B (Y). While it depends of the computational capabilities of the CPU, in a typical CPU used in a printer, several minutes to several tens of minutes are required for the calculation processing of step S903 to step S908. Accordingly, by the CPU 401 performing the determination processing of step S902, downtime is reduced, and it is possible to improve usability at each step.

In step S903, the color material information A of all cartridges is loaded, and stored in the color material information storage unit 801.

Next, based on the color material information A, color coordinates (referred to as Lab values below) in a CIELAB space corresponding to a CMYK color mixture are calculated (step S904). Details of the Lab value calculation will be described later. Next, based on the Lab values obtained in step S904, a color separation table for converting from a device RGB signal into a CMYK signal is generated (step S905). Details of the method of generating of the color separation table will be described later. A color gamut conversion table for converting to the device RGB signal from an RGB signal inputted in relation to the color separation table generated in step S905 is generated (step S906). Details of the method of generating a color gamut conversion table will be described later.

A color conversion parameter that integrates the color separation table obtained in step S905 and the color gamut conversion table obtained in step S906 is generated (step S907). The generated color conversion parameter is written in the color conversion parameter (alternatively, a color conversion table) 601 in the non-volatile memory 402, and simultaneously the data of the color material information A is written in the color material information B (step S908). In this way, based on new color material information A read from the cartridge after the exchange, the color conversion table 601 is updated, and the color material information B is updated to a value that is the same as the color material information A of the cartridge. Accordingly, at the time of a cartridge exchange, it is possible to determine whether there was a change in the color material information, and to set the new color conversion parameter in the case of a change. However, information that is not included in the color material information A such as a spectral reflectance corresponding to paper white need not be updated.

With the above processing, the cartridge exchange processing ends.

[Mixed-Color Lab Value Calculation Processing]

Figure 10:
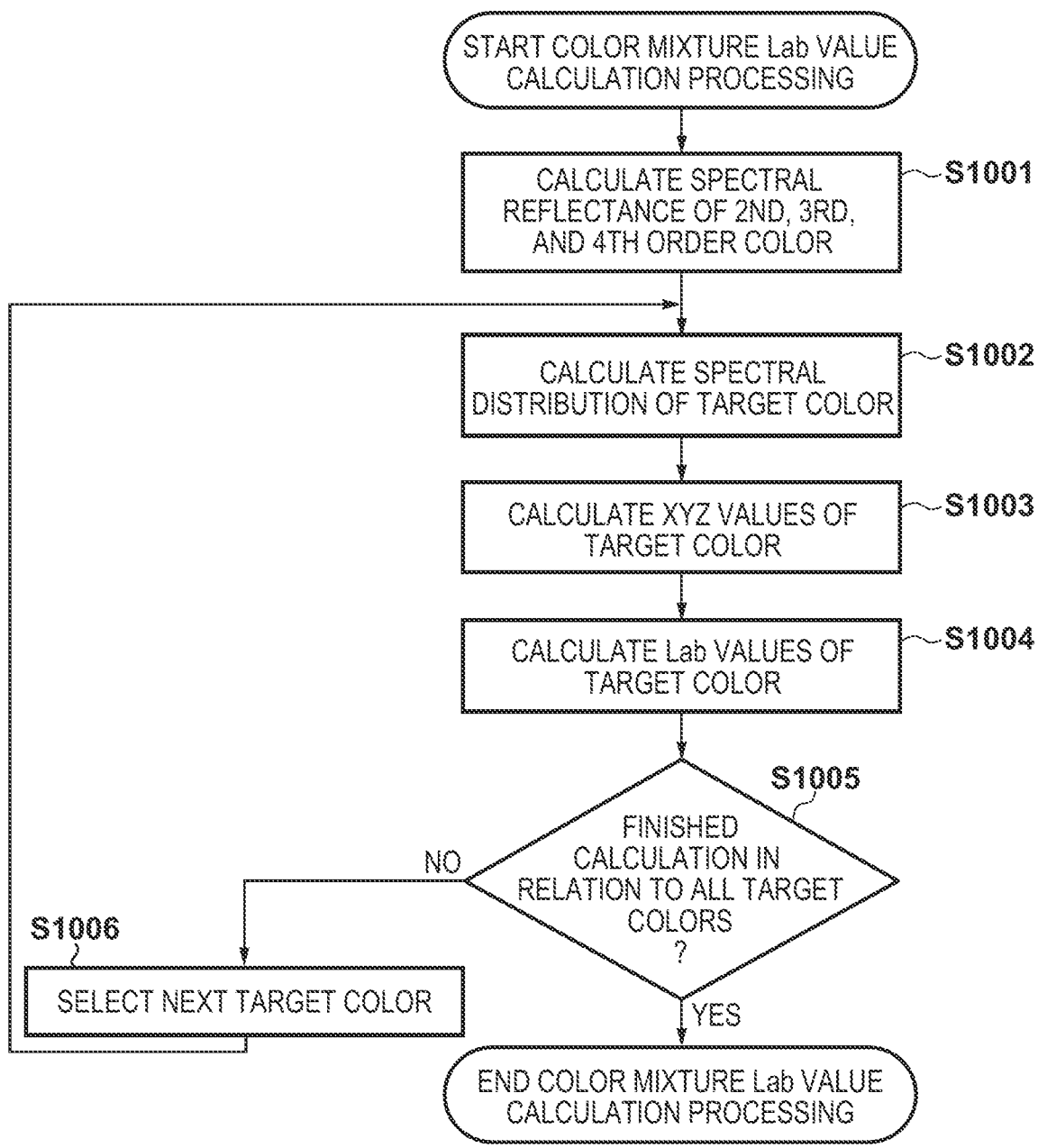
FIG. 10 is a flowchart illustrating a flow of processing for a color mixture Lab value calculation.

Lab value calculation processing on a CMYK color mixture (step S904) will be described using FIG. 10. In the present embodiment, based on spectral reflectances of each color material, CMYK color mixture Lab values are obtained using a Neugebauer method.

Firstly, from the CMYK spectral reflectance of the color material information A, a second order color spectral reflectance is calculated (step S1001) by Equation (1) to Equation (6), a third order color spectral reflectance by Equation (7) to Equation (10), and a fourth order color spectral reflectance by Equation (11).

$$Rcm(\lambda)=Rc(\lambda)\cdot Rm(\lambda) \quad \text{Equation (1)}$$

$$Rcy(\lambda)=Rc(\lambda)\cdot Ry(A) \quad \text{Equation (2)}$$

$$Rck(\lambda)=Rc(\lambda)\cdot Rk(\lambda) \quad \text{Equation (3)}$$

$$Rmy(\lambda)=Rm(L)\cdot Ry(\lambda) \quad \text{Equation (4)}$$

$$Rmk(A)=Rm(\lambda)\cdot Rk(\lambda) \quad \text{Equation (5)}$$

$$Ryk(\lambda)=Ry(\lambda)\cdot Rk(\lambda) \quad \text{Equation (6)}$$

$$Rcmy(\lambda)=Rc(\lambda)\cdot Rm(\lambda)\cdot Ry(\lambda) \quad \text{Equation (7)}$$

$$Rcmk(\lambda)=Rc(A)\cdot Rm(\lambda)\cdot Rk(\lambda) \quad \text{Equation (8)}$$

$$Rcyk(\lambda)=Rc(\lambda)\cdot Ry(\lambda)\cdot Rk(\lambda) \quad \text{Equation (9)}$$

$$Rmyk(\lambda)=Rm(\lambda)\cdot Ry(\lambda)\cdot Rk(\lambda) \quad \text{Equation (10)}$$

$$Rcmyk(\lambda)=Rc(\lambda)\cdot Rm(\lambda)\cdot Ry(\lambda)\cdot Rk(\lambda) \quad \text{Equation (11)}$$

where $Rn(\lambda)$ expresses the spectral reflectance at the wavelength $\lambda$ for color n. The value of $Rn(\lambda)$ is included in the color material information A of each color component.

Next, the Lab values corresponding to the target color is obtained. Target colors are assumed to be combinations of values for which each CMYK tone value (0 to 100%) is changed in 10% intervals, for example. Here, it should be noted that it is necessary to provide a restriction on the sum of the CMYK tone values considering the load on the fixing portion 30. The maximum sum total amount for CMYK tone values that can be used is made to be the sum total restriction amount. In the present embodiment, the color material amount at the maximum density for a single color is assumed to be 100%, and the sum total restriction amount 200%/o. A target color is also assumed to be a combination of CMYK tone values within the sum total restriction amount.

Firstly, a spectral distribution corresponding to a color mixture of CMYK tone values (c, m, y, k) for a target color is obtained (step S1002) by the Neugebauer method. In step S1002, firstly, first order color, second order color, third order color, and fourth order color area ratios are obtained by Equation (12) to Equation (27) below in accordance with CMYK tone values (halftone dot area ratios).

$$Ap=(1-cX)(1-m)(1-y)(1-k) \quad \text{Equation (12)}$$

$$Ac=c\cdot(1-m)(1-y)(1-k) \quad \text{Equation (13)}$$

$$Am=m\cdot(1-c)(1-y)(1-k) \quad \text{Equation (14)}$$

$$Ay=y\cdot(1-c)(1-m)(1-k) \quad \text{Equation (15)}$$

$$Ak=k\cdot(1-c)(1-m)(1-y) \quad \text{Equation (16)}$$

$$Acm=c\cdot m\cdot(1-y)(1-k) \quad \text{Equation (17)}$$

$$Acy=c\cdot y\cdot(1-m)(1-k) \quad \text{Equation (18)}$$

$$Ack=c\cdot k\cdot(1-m)(1-y) \quad \text{Equation (19)}$$

$$Amy=m\cdot y\cdot(1-c)(1-k) \quad \text{Equation (20)}$$

$$Amk=m\cdot k\cdot(1-c)(1-y) \quad \text{Equation (21)}$$

$$Ayk=y\cdot k\cdot(1-c)(1-m) \quad \text{Equation (22)}$$

$$Acmy=c\cdot m\cdot y\cdot(1-k) \quad \text{Equation (23)}$$

$$Acmk=c\cdot m\cdot k\cdot(1-y) \quad \text{Equation (24)}$$

$$Acyk=c\cdot y\cdot k\cdot(1-m) \quad \text{Equation (25)}$$

$$Amyk=m\cdot y\cdot k\cdot(1-c) \quad \text{Equation (26)}$$

$$Acmyk=c\cdot m\cdot y\cdot k \quad \text{Equation (27)}$$

where c, m, y, and k express respective CMYK tone values (area ratios), Ap expresses a paper white area ratio, and An expresses an area ratio for the color n.

Using these, the reflectance $Rt(\lambda)$ of the wavelength $\lambda$ corresponding to a color mixture of a CMYK area ratio (c, m, y, k) is obtained by Equation (28).

$$\begin{aligned} Rt(\lambda) = & Rp(\lambda)\cdot Ap + Rc(\lambda)\cdot Ac + Rm(\lambda)\cdot Am + Ry(\lambda)\cdot Ay + \\ & Rk(\lambda)\cdot Ak + Rcm(\lambda)\cdot Acm + Rcy(\lambda)\cdot Acy + \\ & Rck(\lambda)\cdot Ack + Rmy(\lambda)\cdot Amy + Rmk(\lambda)\cdot Amk + \\ & Ryk(\lambda)\cdot Ayk + Rcmy(\lambda)\cdot Acmy + Rcmk(\lambda)\cdot Acmk + \\ & Rcyk(\lambda)\cdot Acyk + Rmyk(\lambda)\cdot Amyk + Rcmyk(\lambda)\cdot Acmyk \end{aligned} \quad \text{Equation (28)}$$

where $Rp(\lambda)$ expresses the spectral reflectance in a wavelength $\lambda$ of a sheet, and is stored as a part of the color material information B in the color material information storage unit 801.

Next, coordinates (X, Y, Z) in a CIEXYZ color space are obtained (step S1003) by Equation (29) to Equation (32) from the spectral reflectance Rt(A) corresponding to the tonal values (c, m, y, k). Note that in the following equations, $\Sigma_{\lambda=\lambda\min}^{\lambda\max} P(\lambda)$ expresses the sum total of the function $P(\lambda)$ from $\lambda=\lambda\min$ to $\lambda=\lambda\max$. In other words, it is the sum total of the value $P(\lambda)$ corresponding to the wavelength $\lambda$ for which the spectral reflectance is provided.

$$X = k\cdot\Sigma_{\lambda=\lambda\min}^{\lambda\max} S(\lambda)\cdot Rt(\lambda)\cdot x(\lambda) \quad \text{Equation (29)}$$

$$Y = k\cdot\Sigma_{\lambda=\lambda\min}^{\lambda\max} S(\lambda)\cdot Rt(\lambda)\cdot y(\lambda)) \quad \text{Equation (30)}$$

$$Z = k\cdot\Sigma_{\lambda=\lambda\min}^{\lambda\max} S(\lambda) Rt(\lambda)\cdot z(\lambda) \quad \text{Equation (31)}$$

$$k = 100/\Sigma_{\lambda=\lambda\min}^{\lambda\max} S(\lambda)\cdot y(\lambda) \quad \text{Equation (32)}$$

where $S(\lambda)$ is an environment light spectral distribution such as D50, for example, and $x(\lambda)$, $y(\lambda)$, and $z(\lambda)$ express color matching functions. These are known in advance, and are stored in advance as data in the non-volatile memory 402 or embedded as a part of program code. Also, $\lambda\min$ and $\lambda\max$ express upper and lower limit values on the spectral distribution wavelengths (for example, $\lambda\min=380$ nm and $\lambda\max=730$ nm).

Next, the XYZ values obtained in step S1003 is converted (step S1004) by Equation (33) to Equation (36) into Lab values which are coordinates in the CIELAB space which is a uniform color space.

$$L^* = 116\cdot f(Y/Yn) - 16 \quad \text{Equation (33)}$$

$$a^* = 500\cdot[f(X/Xn) - f(Y/Yn)] \quad \text{Equation (34)}$$

$$b^* = 200\cdot[f(Y/Yn) - f(Z/Zn)] \quad \text{Equation (35)}$$

$$\begin{aligned} f(t) &= t^{1/3} & (t > (6\cdot29)^3) \\ &= 1/3\cdot(29/6)^2\cdot t + 4/29 & (t \leq (6\cdot29)^3) \end{aligned} \quad \text{Equation (36)}$$

where Xn, Yn, and Zn express X, Y, and Z values corresponding to a white point.

In step S1005, it is determined whether or not calculation has ended for all of the target colors, and if not, the next target color is selected (step S1006), and once again the processing of step S1002 is transitioned to. When, in step S1005, it is determined that calculation has ended for all of the target colors, the color mixture Lab value calculation processing ends. Note that in the present embodiment, an example of a method for calculating a color mixture using the Neugebauer method was described, but another method such as a Kubelka-Munk method may be used to calculate the color mixture.

[Color Separation Table Generation]

Next, color separation table generation processing (step S905) will be described. Each grid point color (hereinafter referred to as a representative color) in the color separation table is configured by a combination of values for which the device RGB values are changed 1% at a time between 0 to 100% where the input RGB of the color separation table is device RGB. The color separation table is generated based on Lab values for the target colors calculated in step S904. Firstly, fundamental colors (white, cyan, magenta, yellow, red, green, blue, black) are defined as in FIG. 11A and FIG. 11B as reference colors among representative colors. Hereinafter, the fundamental colors white, cyan, magenta, yellow, red, green, blue, and black will be denoted Wo, Co, Mo, Yo, Ro, Go, Blo, and Bko.

Fundamental color device RGB values and CMYK values are defined as in FIG. 12. Regarding Bko, the color for which L* is smallest and chroma $C^*=(a^{*2}+b^{*2})^{1/2}$ is smallest among the target colors is defined to be Bko. Here, the CMYK value of Bko is assumed to be (50, 40, 10, 100). Next, device RGB values and CMYK values for representative colors between fundamental colors are defined.

Figure 13A:
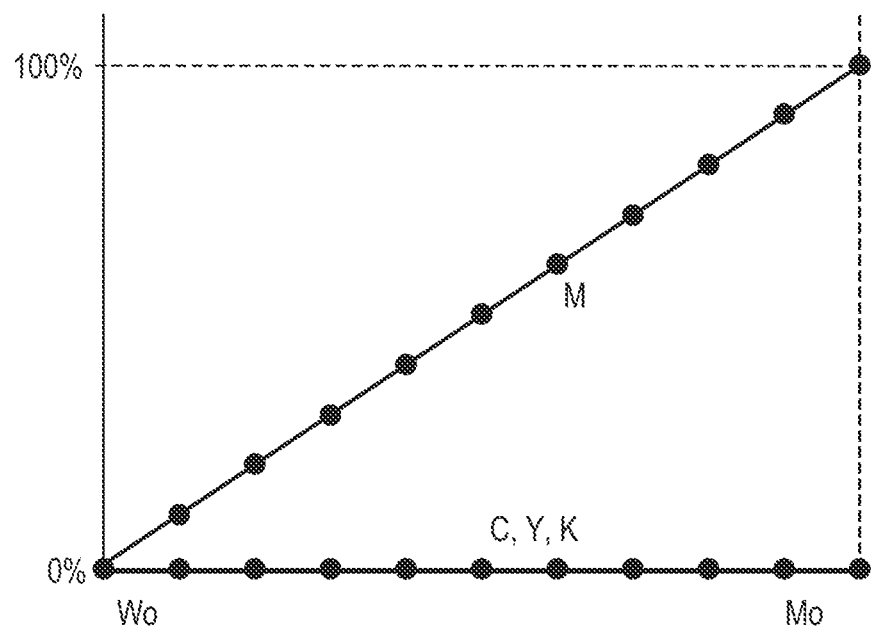
FIG. 13A is a view illustrating an example of CMYK values of fundamental colors.

RGB values of representative colors between fundamental colors are calculated by linear interpolation of device RGB values for each fundamental color at equal 1% intervals. Also, CMYK values of each representative color between fundamental colors other than black are calculated by linear interpolation of CMYK values for each fundamental color at equal 1% intervals. The result of this is that CMYK values of representative colors on the Wo to Mo line 1101 are defined as in FIG. 13A, for example.

Figure 13B:
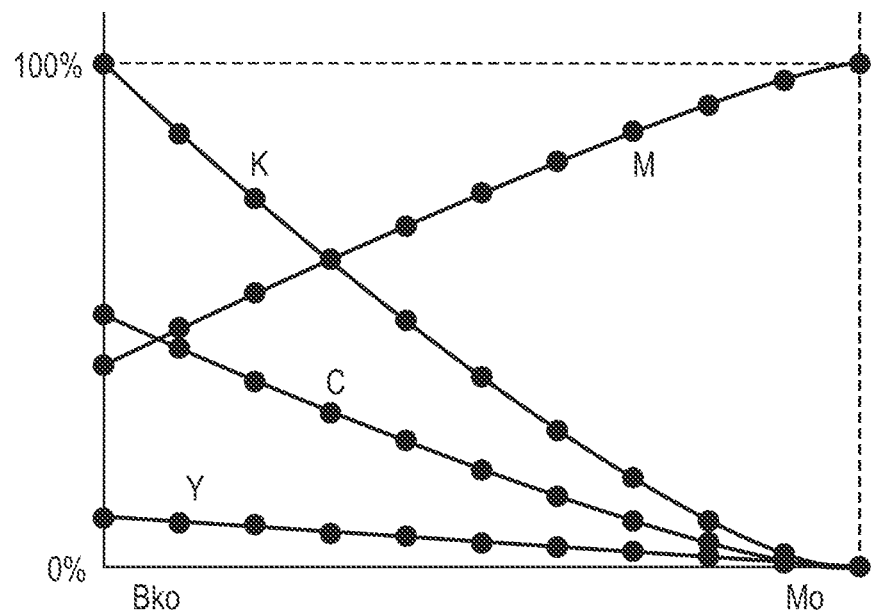
FIG. 13B is a view illustrating an example of CMYK values of fundamental colors.

Regarding CMYK values of representative colors corresponding to lines between each fundamental color and Bko, the CMYK values are calculated so as to connect between the Bko and the respective fundamental color on a straight line in LAB space. The result of this is that the CMYK values of representative colors on the Bko to Mo line 1102 are defined as in FIG. 13B, for example. For CMYK values of representative colors between other fundamental colors, linear interpolation is similarly applied. Configuration may be such that for CMYK values between Bko and each fundamental color, calculation is such that the chroma C* in the LAB space becomes a maximum.

As described above, it is possible to associate device RGB values and CMYK values for representative colors by calculation by linear interpolation, from defined fundamental colors, and device RGB values and CMYK values of representative colors between the fundamental colors, of RGB values and CMYK values of another representative color. Furthermore, by calculating Lab values from each CMYK value of a representative color, a color separation table that associates device RGB values, CMYK values, and Lab values is generated. The calculation is performed by a method similar to the color mixture Lab value calculation process of step S904.

[Color Gamut Conversion Table Generation]

Figure 14:
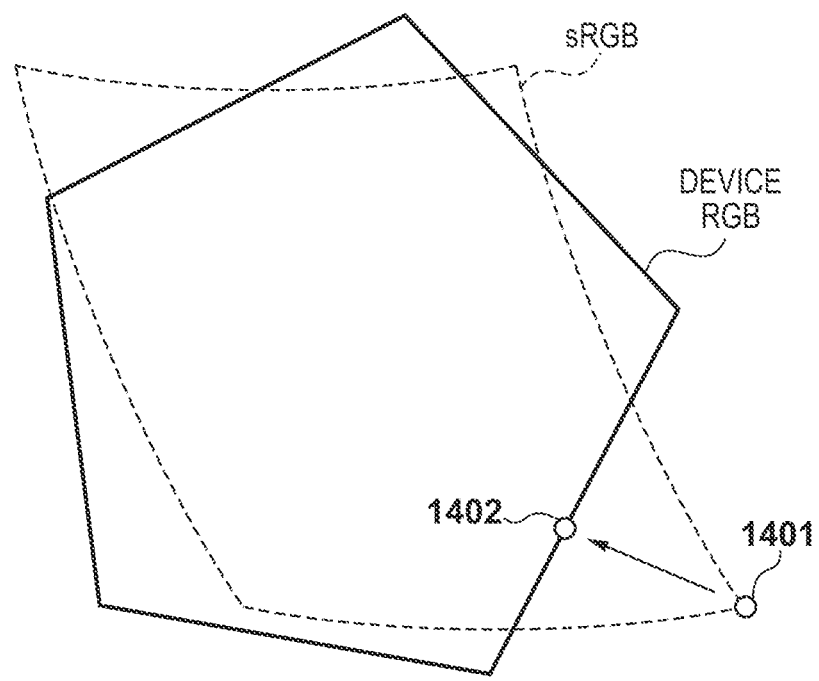
FIG. 14 is a view illustrating a mapping of a color gamut conversion.

A color gamut conversion table is a table for converting from an RGB value such as sRGB which is a standard color space to a device RGB value. FIG. 14 illustrates an example of device RGB and sRGB CIELAB space color gamuts (reproducible color ranges). The region indicated by solid lines indicates the device RGB color gamut, and the region indicated by dotted lines indicates the sRGB color gamut. Since, generally, device RGB and sRGB color gamuts differ, it is necessary to map colors that are represented in sRGB into a different color gamut to be able to reproduce them on an image forming apparatus.

In the present embodiment, combinations of RGB values for the values (0, 17, 34, . . . , 255), which divide 0 to 255 into 16 equal divisions for 8 bit sRGB data, are made to be sRGB representative colors. Lab values for each sRGB representative color are calculated by a known calculation equation, and based on the calculated Lab values, the closest color is selected with reference to the color separation table. Here, the selection of the closest color is performed by calculating, in order, a color difference in the CIELAB space between an sRGB representative color Lab value and representative color Lab values in the color separation table, and selecting the representative color with the smallest color difference.

By this processing, for example, a color 1401 represented in sRGB is mapped to the closest color 1402 (the color with the smallest color difference in the CIELAB space) in device RGB. By the above method, a color gamut conversion table is generated by associating values in device RGB in relation to representative colors in sRGB (sRGB representative colors).

Note that, for the method of mapping, it is possible to select various methods other than the method of mapping to the closest color in the CIELAB space, such as a method that maintains a hue and a method that considers a characteristic of visual perception.

[Color Conversion Parameter Generation]

In step S907, a corresponding CMYK value is obtained by referencing the color separation table in relation to each device RGB value of the color gamut conversion table generated in step S906. By the foregoing processing, the color conversion parameter 601 for converting from sRGB to CMYK is generated. Note that in the present embodiment, the color conversion parameter is generated as a table for converting from sRGB to CMYK, but configuration may be taken to generate a masking coefficient or a UCR coefficient, and convert from sRGB to CMYK by masking processing or UCR processing.

By the foregoing processing, it becomes possible to invariably form an optimal color on a print medium by generating a color conversion parameter (or a color conversion table) that is in accordance with a color material color even in a case where a cartridge is exchanged, and the toner color material color changes.

Note that configuration may be taken so as to store in the cartridge memory 35 a program for processing that performs a color mixture Lab value calculation and generates a color separation table and a color gamut conversion table as described in the present embodiment, to load the program into the work memory 403 upon cartridge exchange, and to execute it by the CPU 401. By taking such a configuration, it becomes possible to appropriately apply processing that is more accurate and highly efficient.

Second Embodiment

Another embodiment of the present invention will be described. Because basic operation of the image forming apparatus in the present embodiment is similar to in the first embodiment, description will be given only for points of difference, abbreviating description of common portions. In the present embodiment, Lab values (in other words, coordinate information in the Lab color space) for when color material of the respective colors in the cartridge memories 35C, M, Y, and K of four tone values of 25%, 50%, 75%, and 100% (hereinafter referred to as target tone values) are formed on a print medium are stored as color material information A.

Figure 15:
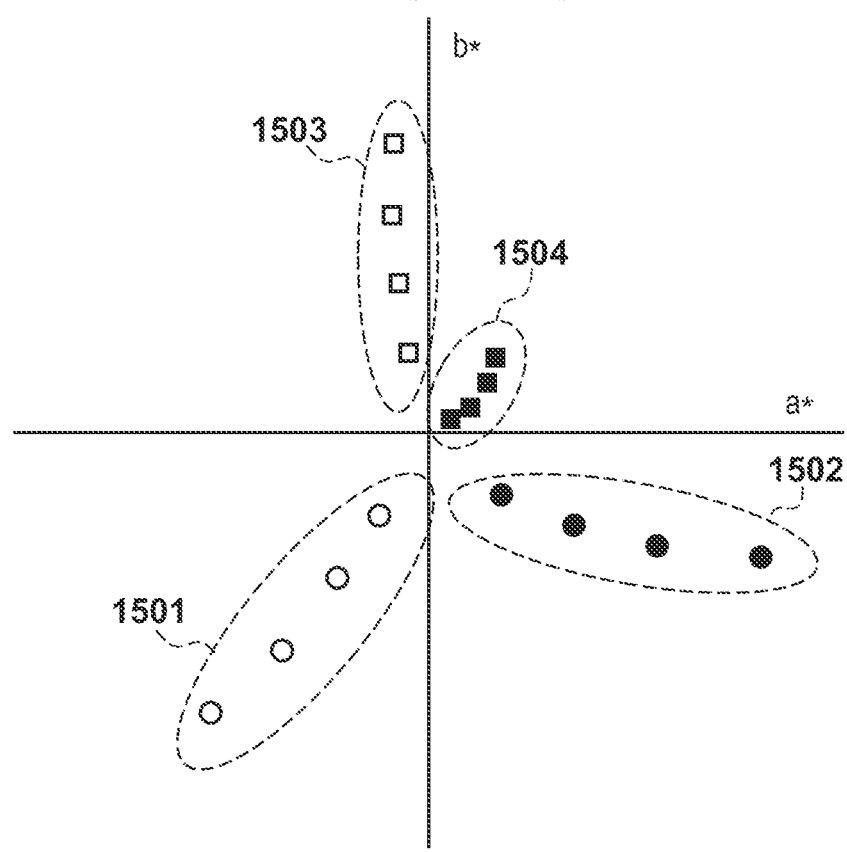
FIG. 15 is a view illustrating Lab values of a second embodiment.

FIG. 15 illustrates an example in which Lab values of CMYK target tone values are plotted on an a*, b* plane. A point group 1501 in the view indicates cyan data, a point group 1502 indicates magenta data, a point group 1503 indicates yellow data, and a point group 1504 indicates black data. Also, Lab values corresponding to target tone values of the image forming apparatus are stored as color material information B in the color material information storage unit 801.

In the present embodiment, it is assumed that combinations of 5 tones, adding the tone value 0% to the target tone values for CMYK, are target colors. Lab values corresponding to a target color are stored as color material information C in the color material information storage unit 801. Values based on color material information prior to the exchange of cartridges are stored in the color material information B and C.

Figure 9:
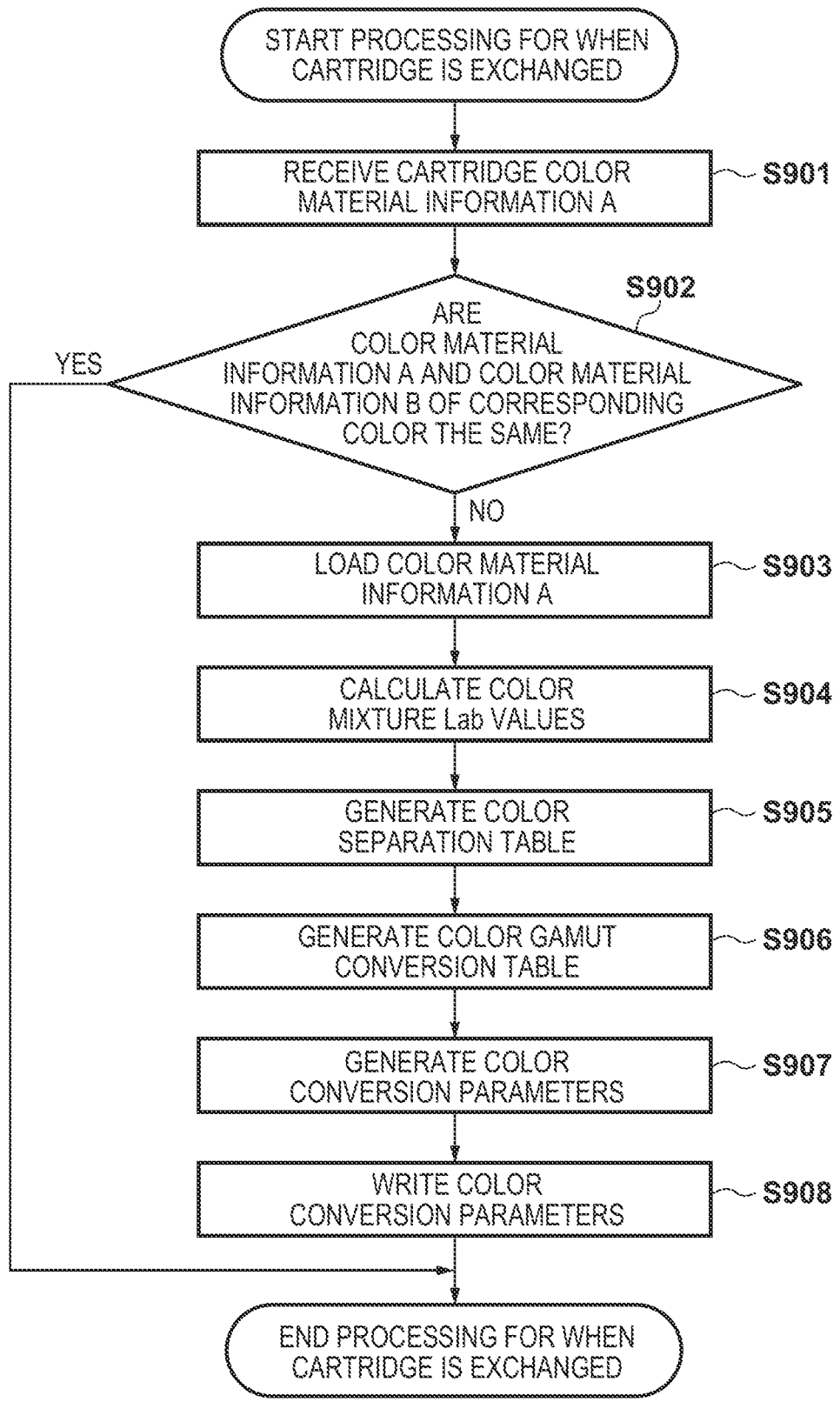
FIG. 9 is a flowchart illustrating a flow of processing at a time of exchanging a cartridge.

Processing in the flow of FIG. 9 is performed when a cartridge is exchanged in the present embodiment. In step S902, it is determined whether or not the received color material information A is the same as the color material information B of the corresponding color. If the color material information A and the color material information B for all cartridges that were exchanged are the same, the processing ends when the color of the color material has not changed. If the color material information A and the color material information B for the corresponding color is not the same for even one color, it is determined that the color of the color material changed, and the processing proceeds to step S903.

In step S903, the color material information A of all cartridges is loaded, and stored in the color material information storage unit 801.

Figure 16:
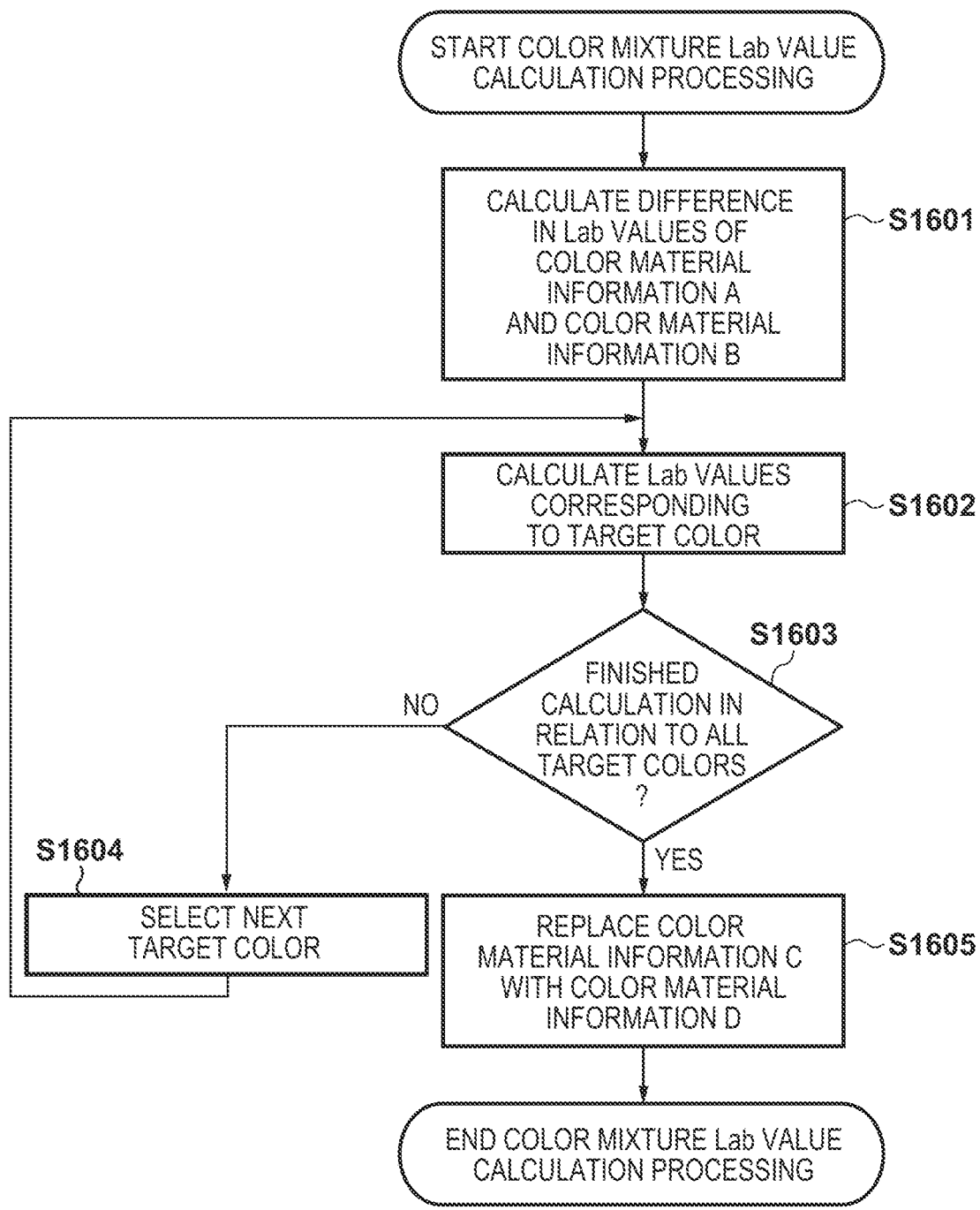
FIG. 16 is a flowchart illustrating a flow of processing of a color mixture Lab value calculation of the second embodiment.
Figure 18A:
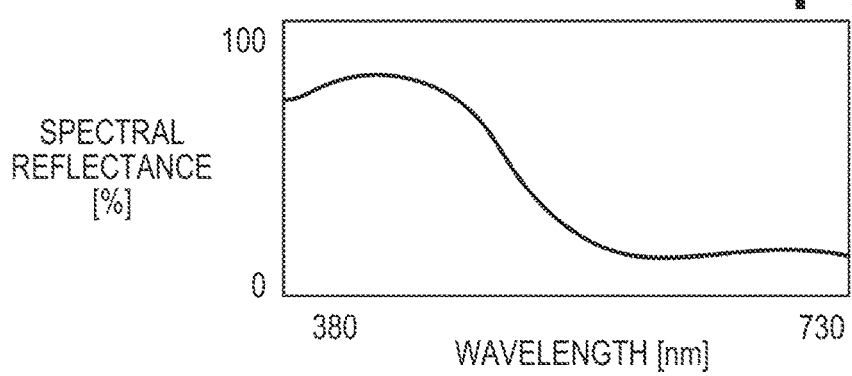
FIG. 18A is a view illustrating a distribution of spectral reflectance of a fourth embodiment.
Figure 18B:
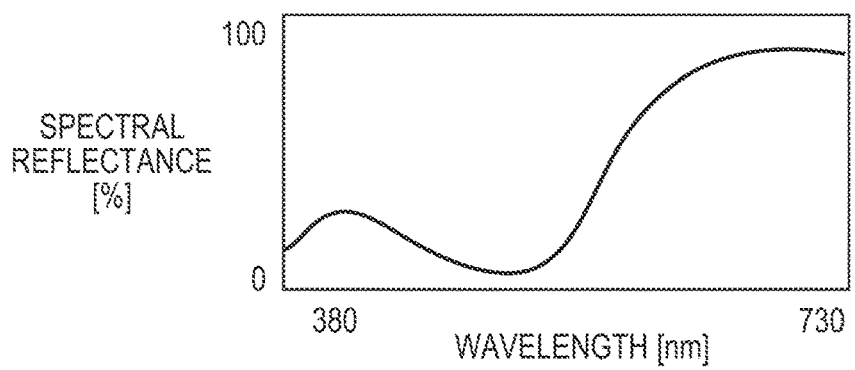
FIG. 18B is a view illustrating a distribution of spectral reflectance of the fourth embodiment.
Figure 18C:
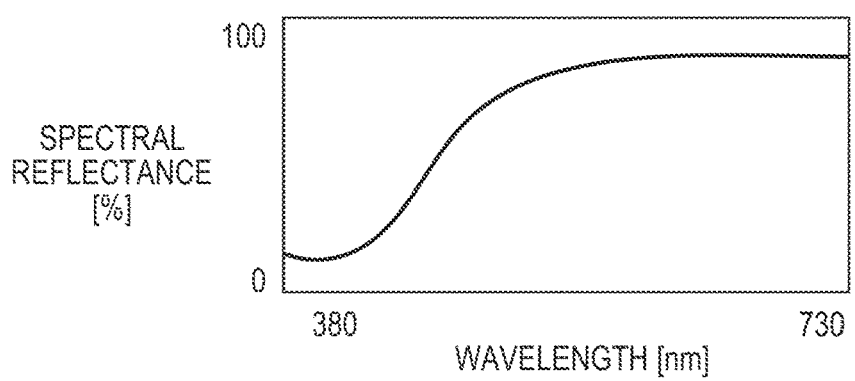
FIG. 18C is a view illustrating a distribution of spectral reflectance of the fourth embodiment.
Figure 18D:
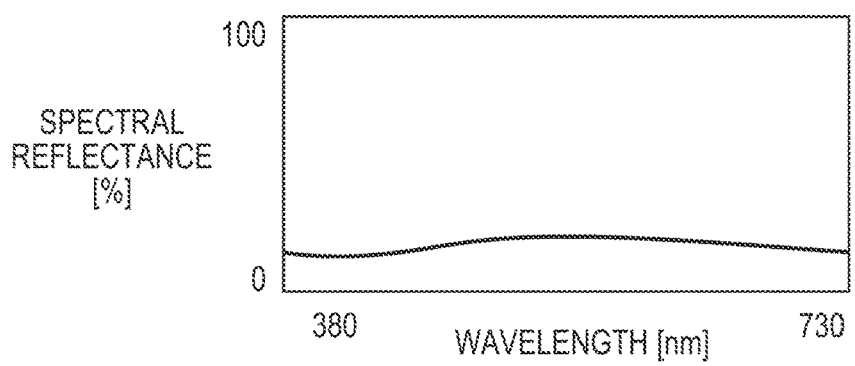
FIG. 18D is a view illustrating a distribution of spectral reflectance of the fourth embodiment.
Figure 18E:
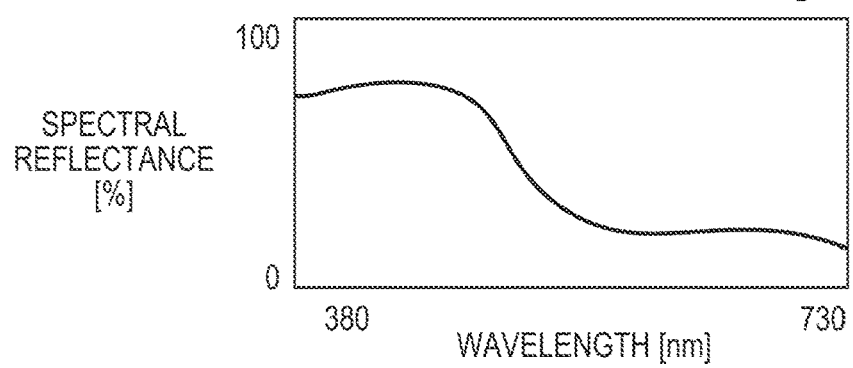
FIG. 18E is a view illustrating a distribution of spectral reflectance of the fourth embodiment.
Figure 18F:
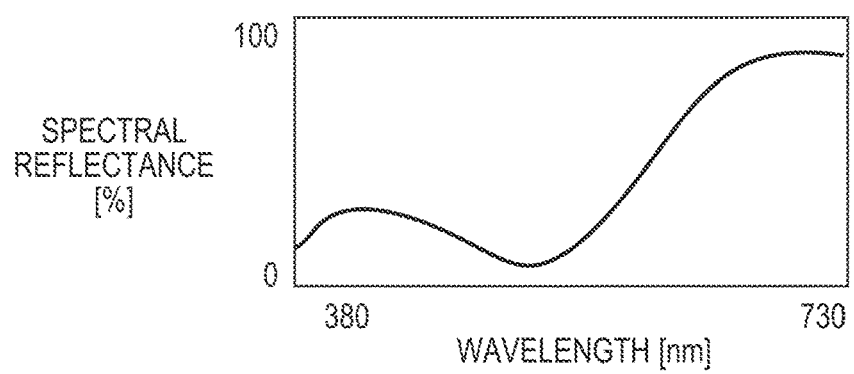
FIG. 18F is a view illustrating a distribution of spectral reflectance of the fourth embodiment.
Figure 18G:
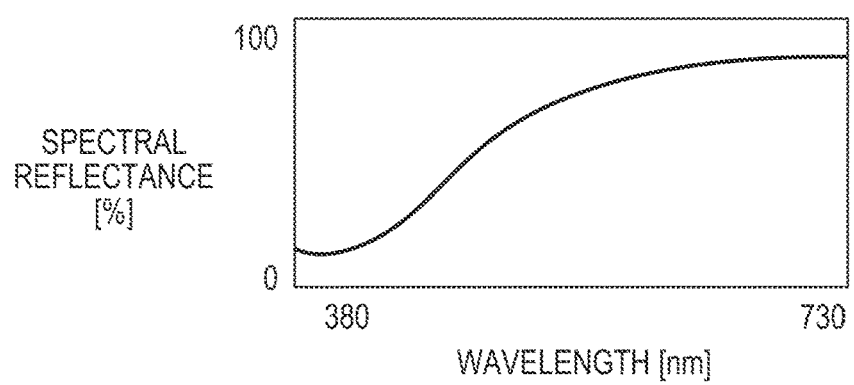
FIG. 18G is a view illustrating a distribution of spectral reflectance of the fourth embodiment.
Figure 18H:
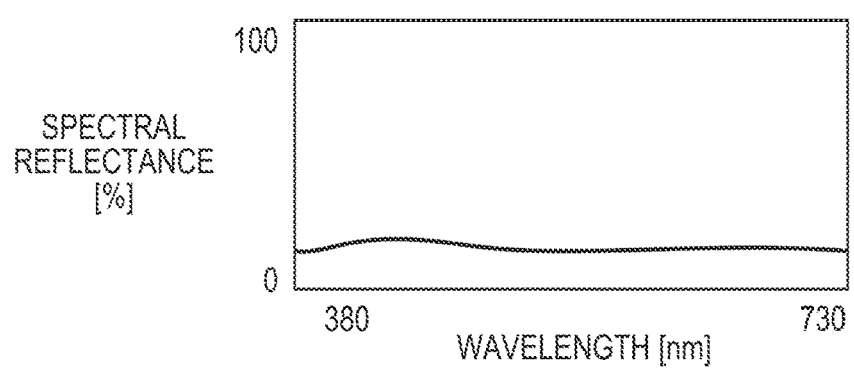
FIG. 18H is a view illustrating a distribution of spectral reflectance of the fourth embodiment.

Next, Lab values corresponding to CMYK color mixtures are calculated (step S904). The Lab value calculation method in the present embodiment is described using FIG. 16. Based on the color material information A, B, and C, Lab values corresponding to the CMYK color mixtures are calculated.

Firstly, differences between Lab values of the color material information A and the color material information B are calculated by Equation (37) to Equation (48) (step S1601).

$$dL\_C(n)=L\_C\_A(n)-L\_C\_B(n) \quad \text{Equation (37)}$$

$$da\_C(n)=a\_C\_A(n)-a\_C\_B(n) \quad \text{Equation (38)}$$

$$db\_C(n)=b\_C\_A(n)-b\_C\_B(n) \quad \text{Equation (39)}$$

$$dL\_M(n)=L\_M\_A(n)-L\_M\_B(n) \quad \text{Equation (40)}$$

$$da\_M(n)=a\_M\_A(n)-a\_M\_B(n) \quad \text{Equation (41)}$$

$$db\_M(n)=b\_M\_A(n)-b\_M\_B(n) \quad \text{Equation (42)}$$

$$dL\_Y(n)=L\_Y\_A(n)-LY\_B(n) \quad \text{Equation (43)}$$

$$da\_Y(n)=a\_Y\_A(n)-a\_Y\_B(n) \quad \text{Equation (44)}$$

$$db\_Y(n)=b\_Y\_A(n)-b\_Y\_B(n) \quad \text{Equation (45)}$$

$$dL\_K(n)=L\_K\_A(n)-L\_K\_B(n) \quad \text{Equation (46)}$$

$$da\_K(n)=a\_K\_A(n)-a\_K\_B(n) \quad \text{Equation (47)}$$

$$db\_K(n)=b\_K\_A(n)-b\_K\_B(n) \quad \text{Equation (48)}$$

where dL_C denotes the difference in L* for C, L_C_A denotes the L* value for the color material information A for C, and L_C_B denotes the L* value for the color material information B for C. Also, n indicates a target tone value number where 1 . . . 25%, 2 . . . 50%, 3 . . . 75%, and 4 . . . 100%.

Next, in step S1602, the color material information C is corrected, and Lab values (color material information D) corresponding to a target color after the cartridge exchange are generated. When the color material information C corresponding to a target color of the CMYK values (Ct, Mt, Yt, Kt) is assumed to be (Lc, ac, bc), the color material information D (Ld, ad, bd) corresponding to (Ct, Mt, Yt, Kt) is calculated by Equation (49) to Equation (55).

$$Ld = Lc + dL\_C(Ct/25)\cdot kc + dL\_M(Mt/25)\cdot km + dL\_Y(Yt/25)\cdot ky + dL\_K(Kt/25)\cdot kk \quad \text{Equation (49)}$$

$$ad = ac + da\_C(Ct/25)\cdot kc + da\_M(Mt/25)\cdot km + da\_Y(Yt/25)\cdot ky + da\_K(Kt/25)\cdot kk \quad \text{Equation (50)}$$

$$bd = bc + db\_C(Ct/25)\cdot kc + db\_M(Mt/25)\cdot km + db\_Y(Yt/25)\cdot ky + db\_K(Kt/25)\cdot kk \quad \text{Equation (51)}$$

where $$kc=Ct/(Ct+Mt+Yt+Kt) \quad \text{Equation(52)}$$

$$km=Mt/(Ct+Mt+Yt+Kt) \quad \text{Equation(53)}$$

$$ky=Yt/(Ct+Mt+Yt+Kt) \quad \text{Equation(54)}$$

$$kk=Kt/(Ct+Mt+Yt+Kt) \quad \text{Equation(55)}$$

In step S1603, it is determined whether or not calculation has ended for all of the target colors, and if not, the next target color is selected (step S1604), and once again the processing of step S1602 is transitioned to. When it is determined in step S1603 that calculation has ended for all target colors, the replacement of the color material information C with the generated color material information D is performed (step S1605), and color mixture Lab value calculation processing is ended.

By the foregoing processing, it is possible to generate the color material information D corresponding to color material after an exchange by correcting the color material information C using the difference between the color material information A and the color material information B. After the Lab value calculation processing, processing similar to in the first embodiment is performed with the color material information D as the target color Lab values. In other words, for example, the processing from step S905 is performed to update the color conversion parameter 601 and further update the color material information B by the color material information A. Note that, in the present embodiment, in order to simplify the explanation, four target tone values were described, but there is no limitation to four target tone values, and any appropriate number of values may be specified considering accuracy and memory capacity. Also, a method of correcting a current color mixture parameter to produce a new color mixture parameter is not limited to the described method, and other methods may be used. Also, similarly to in the first embodiment, configuration may be taken so as to store a program for processing a color mixture Lab value calculation in the cartridge memory 35.

Third Embodiment

Another embodiment of the present invention will be described. Because basic operation of the image forming apparatus in the present embodiment is similar to in the first embodiment, description will be given only for points of difference, abbreviating description of common portions. In the present embodiment, an example in which a black cartridge is exchanged with a red cartridge will be described. In the present embodiment, spectral distributions may be used as the color material information A as in the first embodiment and Lab values may be used as in the second embodiment.

In the present embodiment, processing in the flow of FIG. 9 is performed when a cartridge is exchanged. The sum total restriction amount in the present embodiment is made to be 200%. The color separation table generation processing of step S905 in the present embodiment will be described.

In the present embodiment as well, the color separation table is generated based on Lab values for the target colors calculated in step S904. In the present embodiment, since red toner is used instead of black toner, CMYR values are defined instead of CMYK values.

Firstly, fundamental color device RGB values and CMYR values are defined as in FIG. 17. Here, for Bko, black toner cannot be used, so a color for which L* is lowest and chroma $C^*=(a^{*2}+b^{*2})^{1/2}$ is smallest among the target colors in a combination of CMY toners is defined as Bko. Here, the CMYR value of Bko is assumed to be (100, 60, 40, 0). Also, for Ro, in order to maximize the chroma in the sum total restriction amount, the red tone value is made to be 100% and the magenta and yellow tone values are made to be 50%.

The method for calculating the representative color is performed by a similar method to that of the first embodiment. As described above, it becomes possible to generate a color separation table in which the color gamut in the red system is extended by mounting red toner instead of black toner, and it becomes possible for a user to obtain a more vivid image in the red system. In the present embodiment as well, configuration may be taken so as to store, in the cartridge memory 35, a program for processing that generates a color separation table for when an exchange with a new color toner cartridge is performed. In this way, in the present embodiment, even if a cartridge exchange accompanying a change in a color component is performed, it is possible to realize image formation corresponding to the new color component without the user performing any particular operation.

Fourth Embodiment

Another embodiment of the present invention will be described. Because basic operation of the image forming apparatus in the present embodiment is similar to in the first embodiment, description will be given only for points of difference, abbreviating description of common portions. In the present embodiment, a color conversion parameter is reconstructed not only when a cartridge is exchanged, but also depending on the cartridge consumption state.

In the present embodiment, a spectral reflectance (hereinafter, spectral distribution A) for a color material color when a cartridge usage is started and a spectral reflectance (hereinafter, spectral distribution B) for a color material color when the end of the cartridge's life span is reached are stored as color material information A in the cartridge memory 35. FIG. 18A to FIG. 18D each illustrate examples of a CMYK spectral distribution A. In addition, FIG. 18E to FIG. 18H each illustrate examples of a CMYK spectral distribution B. Furthermore, drum counters A and B are stored in the cartridge memory 35. The drum counters A and B are arranged for each color, and, for example, stored in the non-volatile memory 306 of the printer engine 104, and read out by the CPU 303 and the CPU 401 as appropriate, and updated in conjunction with the drums being driven. The drum counters A and B are initialized to 0 when usage of the cartridge is started, and the drum counters A and B are incremented every time the photosensitive drum 22 for the cartridge is rotated when printing. Also, a value of the drum counter A when the cartridge life span is reached is assumed to be T.

The spectral distribution A is used as the color material information A to perform similar processing to in the first embodiment when cartridges are exchanged.

Figure 19:
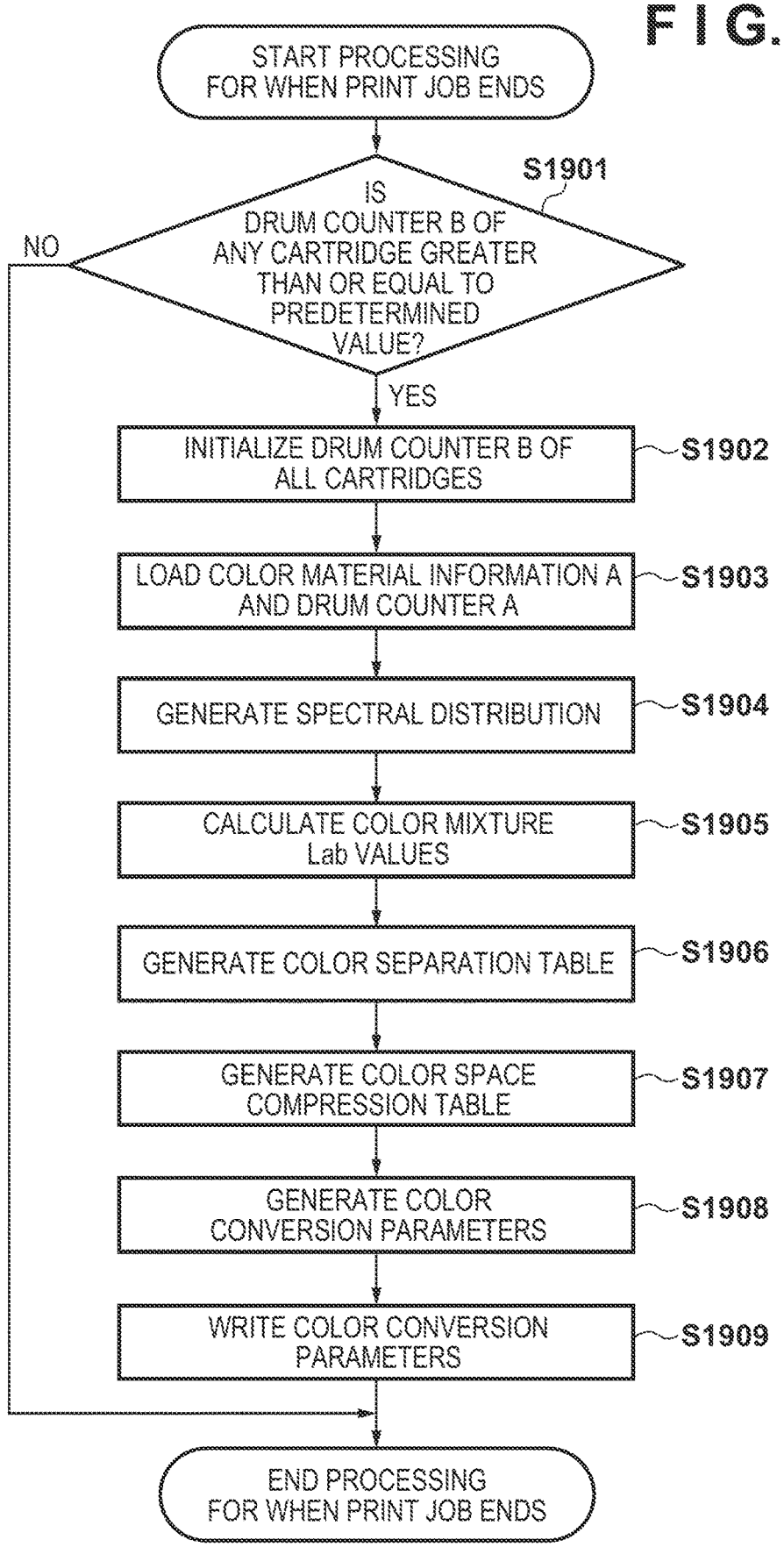
FIG. 19 is a flowchart illustrating a flow of processing when a print job ends in the fourth embodiment.

FIG. 19 is used to describe processing when the print job end in the present embodiment. When a print job ends, the CPU 401 references the drum counter B of each cartridge via the engine I/F 307 and compares (step S1901) it with a predetermined value. In the case where none of the drum counters B has reached the predetermined value, the processing simply ends. When any of the drum counters B has reached the predetermined value, processing for generating a color conversion parameter from step S1902 is executed. This predetermined value may be a value that is smaller than T and, for example, at which a change in tint has been found to arise. This predetermined value can also be said to be a reference value that indicates that a cartridge usage amount has reached a predetermined amount. The cartridge usage amount is stored in the non-volatile memory 306 of the printer engine 104. The CPU 401 updates the drum counters in accordance with, for example, a number of drum rotations, drum driving times, and a number of sheets fed for printing. Also, the determination by the CPU 401 as to whether or not a drum counter B has reached a predetermined amount may be a determination as to whether or not the drum counter B has exceeded a threshold (a predetermined value) or may be a determination as to whether or not it has fallen below a threshold in a case where it gradually drops from an initial value for a drum usage amount corresponding to an update.

Firstly, in step S1902, a drum counter B is initialized to 0 for all of the cartridges, and in step S1903, color material information A and a drum counter A are loaded for all cartridges, and stored in the color material information storage unit 801.

In step S1904, new spectral distribution data (spectral distribution C) is generated by Equation (56) to Equation (59) by using the CMYK spectral distributions A and B and the drum counter A loaded in step S1903.

$$RCc(\lambda)=(1-Dc/T)\cdot RAc(\lambda)+(Dc/T)\cdot RBc(\lambda) \quad \text{Equation (56)}$$

$$RCm(\lambda)=(1-Dm/T)\cdot RAm(\lambda)+(Dm/T)\cdot RBm(\lambda) \quad \text{Equation (57)}$$

$$RCy(\lambda)=(1-Dy/T)\cdot RAy(\lambda)+(Dy/T)\cdot RBy(\lambda) \quad \text{Equation (58)}$$

$$RCk(\lambda)=(1-Dk/T)\cdot RAk(\lambda)+(Dk/T)\cdot RBk(\lambda) \quad \text{Equation(59)}$$

where, $RAc(\lambda)$ indicates an initial spectral distribution A for the wavelength h for Cyan, $RBc(\lambda)$ indicates the spectral distribution B for when the life span is reached for the wavelength $\lambda$ for Cyan, $RCc(\lambda)$ indicates a spectral distribution C for the current time in the wavelength $\lambda$ for Cyan, and Dc indicates a value of the drum counter A for Cyan. The denotation is similar for the other colors. T is the value of the drum counter at the time when the life time is reached as previously described.

By interpolating the spectral distributions A and B by the foregoing processing, it is possible to generate a spectral distribution C in accordance with the number of revolutions of the drum.

In step S1905, a color mixture Lab value calculation is performed by a similar method to that of the first embodiment using the spectral distribution C generated in step S1904. The processing from step S1906 is similar to in the first embodiment as so description thereof is abbreviated.

By the foregoing processing, it becomes possible to invariably form an optimal color on a print medium by generating a color conversion parameter according to the color material color, even in a case where the color of the color material changes in conjunction with rotation of a drum.

Note that two spectral distributions (spectral distributions A and B) are used in the present embodiment, but the number of spectral distributions used for calculation is not limited to 2. Also, configuration may be such that only the spectral distribution A is held, and the spectral distribution A is corrected depending on a coefficient in accordance with a value of the drum counter A to generate new spectral distribution data.

In addition, an example in which spectral distribution data is used is described in the present embodiment, but configuration may be taken to hold Lab values for each color material color for when cartridge usage is started and when the life span is reached as in the second embodiment, and to calculate updated Lab values in accordance with the value of the drum counter A.

Furthermore, in the present embodiment, the number of revolutions of the drum and the spectral distribution are associated, but configuration may be taken to generate the spectral distribution C in association with another condition such as the temperature of the image forming apparatus or the humidity.

Fifth Embodiment

Figure 20:
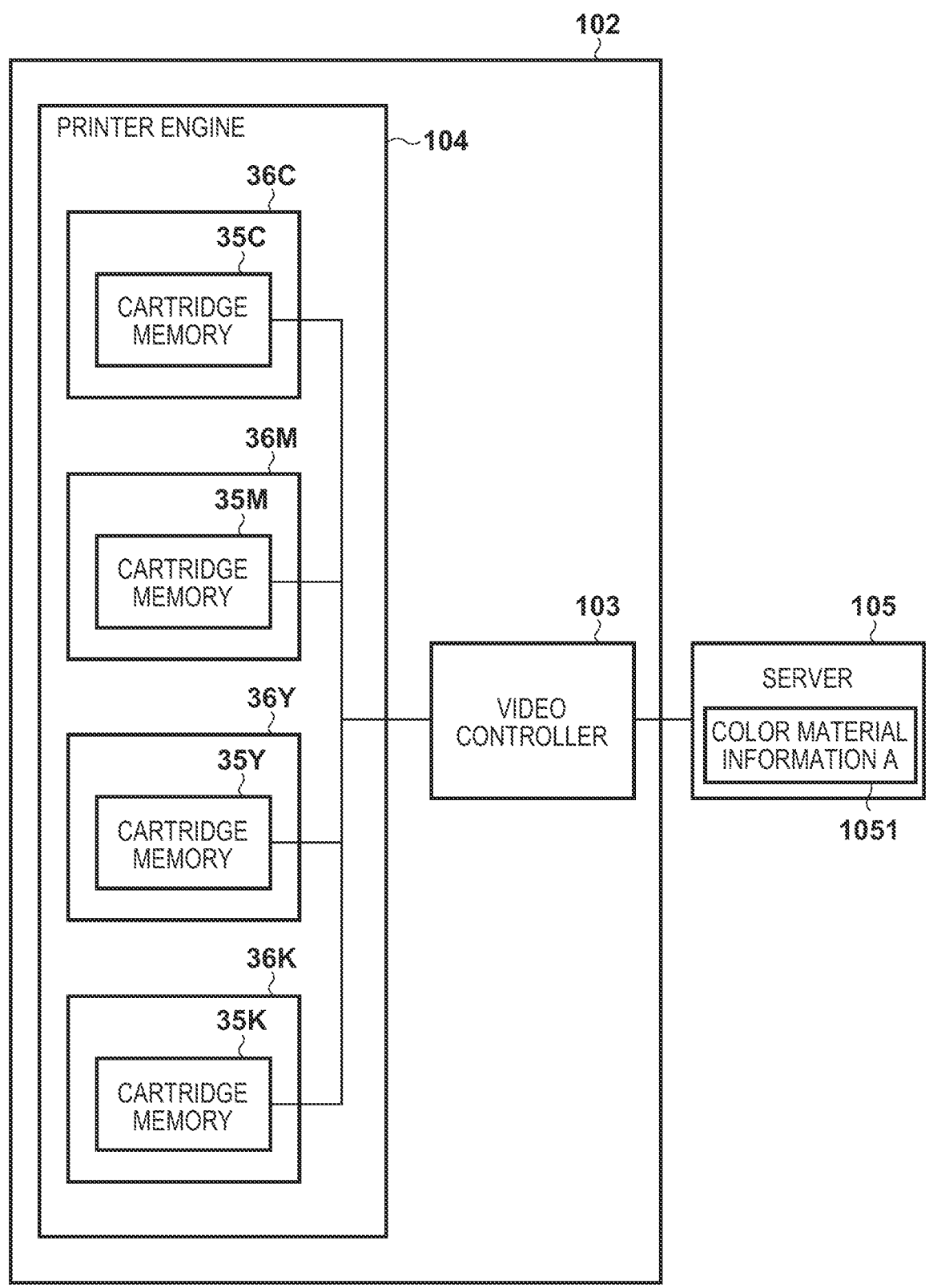
FIG. 20 is a view illustrating a configuration of a fifth embodiment.

In the present embodiment, the color material information A of the first to fourth embodiments is stored in an external server rather than in a cartridge memory 35. The configuration of the present embodiment is illustrated in FIG. 20. Color material information A 1051 is stored in the server 105, and address information that indicates the address of the color material information A 1051 in the server (in other words, that identifies the color material information A) is stored in the cartridge memory 35. When cartridges are exchanged, the CPU 303 reads address information in the cartridge memory 35 and notifies the video controller 103 via the engine I/F 307. The CPU 401 of the video controller accesses the color material information A in the server via the network based on the notified address information, and reads the color material information A. The color material information A corresponds to the color material information A described in the first to fourth embodiments, for example.

By the foregoing configuration, it becomes possible to reduce the cost and size of the cartridge memory 35 because the space for data in the cartridge memory 35 becomes smaller since the color material information 1051 associated with the cartridge is stored in the server 105.

Also, configuration may be taken to store the color material information B of the fourth embodiment in the server 105, to store address information therefor in the cartridge memory 35, and to read the color material information B using that address information from the image forming apparatus. In this way, it is possible to update the color conversion table in accordance with a temporal change in the tint of the color material as performed in the fourth embodiment, and it is possible to suppress a change in color from appearing in an image.

Furthermore, configuration may be such that the image forming apparatus 102, by notifying to the server that a cartridge exchange was performed, causes a color conversion table calculation (FIG. 9, FIG. 10, and the like) to be performed on the server 105 at the time of a cartridge exchange in the first through fourth embodiments, and the image forming apparatus 102 receives the result thereof. Also, configuration may be taken such that the image forming apparatus 102 notifies to the server 105 that the drum counter B reached the predetermined value, and causes the processing of FIG. 19 to be performed, and receives a color conversion table which is the result thereof. In this way, it is possible to calculate the color conversion table in the high performance server 105, and it is possible to suppress the processing load on the image forming apparatus.

An image forming apparatus that forms an image using a plurality of color components was described in the foregoing embodiments, but if the color material is such that the tint may change in accordance with a cartridge exchange and a temporal change, reconfiguration of the color conversion table may be performed even for a single color similarly to in the foregoing embodiments. Also, toner was given as an example of the color material in the foregoing embodiments, but no limitation is made to this. For example, in an image forming apparatus that uses ink as the color material, if color material information for ink is stored in the cartridge memory 35, and the image forming apparatus performs the same processing as is described above, it is possible to perform an appropriate reconfiguration of color conversion table in relation to a change in the color material.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Also, in the description of the respective embodiments above, the printer engine 104 and the video controller 103 are described as being separate hardware, and respectively arranged CPUs perform processing that is respectively assigned thereto. However, there is no limitation to this configuration. For example, configuration may be such that some of the processes of the CPU 401 described above are performed by the CPU 303. Alternatively, configuration may be such that some of the processes of the CPU 303 described above are performed by the CPU 401. Also, configuration may be taken such that the printer engine 104 and the video controller 103 are realized by the same hardware, and the processing described above as being of the CPU 303 and the CPU 401 is performed by one CPU. Alternatively, configuration may be such that a CPU is arranged in addition to the printer engine 104 and/or the video controller 103, and that some of the processing is performed by the added CPU.

As described above, by virtue of the present invention, it becomes possible to economize on cartridge storage capacity while appropriately performing a color conversion in relation to a characteristic change of color material of a cartridge.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-035421, filed Feb. 28, 2018 which is hereby incorporated by reference herein in its entirety.

What is claimed is:

1. An image forming apparatus for which a plurality of color material cartridges can be attached/detached, the plurality of color material cartridges containing cyan (C), magenta (M), yellow (Y) and black (K) color materials respectively, each of the plurality of color material cartridges having a storage unit, the image forming apparatus operable to form, based on an input image signal, a visible image on a print medium using the color materials contained in the plurality of material cartridges, and the storage unit storing material information including information of a spectral reflectance of the color material or coordinate information in a predetermined color space of the color material contained in the color material cartridge, the image forming apparatus comprising:
at least one memory; and
at least one processor, wherein at least one program stored in the at least one memory causes, when executed by the at least one processor, the at least one processor to act as:
an obtaining unit configured to obtain the color material information from a storage unit of a color material cartridge attached to the image forming apparatus;
a determination unit configured to determine whether or not the color material information obtained by the obtaining unit from the storage unit of a newly exchanged cartridge is the same as the color material information stored in the storage unit of a previously used cartridge;
a generation unit configured to generate a color conversion parameter based on the color material information obtained by the obtaining unit from the storage unit of each of the plurality of color material cartridges, wherein the color conversion parameter maps color components of each of target colors from RGB to CMYK; and
a color conversion unit configured to convert the input image signal into a color signal for the color material using the color conversion parameter, the input color signal represents colors with RGB color components and the color signal for the color material represents colors with CMYK color components,
wherein,
the generation unit does not generate the color conversion parameter in a case where the determination unit determines that the color material information stored in the storage unit of the newly exchanged cartridge is not the same as the color material information stored in the previously used cartridge, and the generation unit generates the color conversion parameter based on the color material information stored in the storage units of plurality of color material cartridges in a case where the determination unit determines that the color material information stored in the storage unit of the newly exchanged cartridge is the same as the color material information stored in the previously used cartridge,
and wherein
in a case where the generation unit generates the color conversion parameter, the generation unit associates RGB color components with CMYK color components of the target colors to generate the color conversion parameter, using the color material information stored in the storage units of the color material cartridges corresponding to color components of each of the target colors.

2. The image forming apparatus according to claim 1, wherein the at least one program causes the at least one processor to act as a communication unit that communicates with a server, wherein
the color material information is stored in the server in association with a color material cartridge that can be attached/detached with respect to the image forming apparatus and that is for storing the color material.

3. The image forming apparatus according to claim 1, wherein the color material information further comprises information related to a temporal change of a color of the color material, and
when a usage amount of the color material cartridge has reached a predetermined amount, the generation unit generates the color conversion parameter based on the information related to a temporal change of a color of the color material.

4. The apparatus according to claim 1, wherein the generation unit obtains $L^*a^*b^*$ values corresponding to the target colors including mixture of CMYK color components, and associates RGB color components with CMYK color components of the target colors using the obtained $L^*a^*b^*$ values.

5. A method of controlling an image forming apparatus for which a plurality of color material cartridges can be attached/detached, the plurality of color material cartridges containing cyan (C), magenta (M), yellow (Y) and black (K) color materials respectively, each of the plurality of color material cartridges having a storage unit, the image forming apparatus operable to form, based on an input image signal, a visible image on a print medium using the color materials contained in the plurality of material cartridges, and the storage unit storing material information including information of a spectral reflectance of the color material or coordinate information in a predetermined color space of the color material contained in the color material cartridge, the method comprising:
obtaining the color material information from a storage unit of a color material cartridge attached to the image forming apparatus;
determining whether or not the color material information obtained by the obtaining unit from the storage unit of a newly exchanged cartridge is the same as the color material information stored in the storage unit of a previously used cartridge;
generating a color conversion parameter based on the obtained color material information from the storage unit of each of the plurality of color material cartridges, wherein the color conversion parameter maps color components of each of target colors from RGB to CMYK; and
converting the input image signal into a color signal for the color material using the color conversion parameter, the input color signal represents colors with RGB color components and the color signal for the color material represents colors with CMYK color components, wherein, the color conversion parameter is not generated in a case where the determination unit determines that the color material information stored in the storage unit of the newly exchanged cartridge is not the same as the color material information stored in the previously used cartridge, and the color conversion parameter is generated based on the color material information stored in the storage units of plurality of color material cartridges in a case where the determination unit determines that the color material information stored in the storage unit of the newly exchanged cartridge is the same as the color material information stored in the previously used cartridge, and wherein in a case where the color conversion parameter is generated, RGB color components are associated with CMYK color components of the target colors to generate the color conversion parameter, using the color material information stored in the storage units of the color material cartridges corresponding to color components of each of the target colors.

* * * * *